(12) United States Patent
Sawachi

(10) Patent No.: US 7,911,496 B2
(45) Date of Patent: Mar. 22, 2011

(54) METHOD OF GENERATING RANGE IMAGES AND APPARATUS THEREFOR

(75) Inventor: Youichi Sawachi, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 539 days.

(21) Appl. No.: 11/928,988

(22) Filed: Oct. 30, 2007

(65) Prior Publication Data

US 2008/0106620 A1 May 8, 2008

(30) Foreign Application Priority Data

Nov. 2, 2006 (JP) .................................. 2006-299463

(51) Int. Cl.
  *H04N 15/00* (2006.01)
  *H04N 5/235* (2006.01)
(52) U.S. Cl. ...................................... 348/42; 348/222.1
(58) Field of Classification Search .................. 348/262, 348/42, 47, 272, 273, 222.1, 345
See application file for complete search history.

(56) References Cited

U.S. PATENT DOCUMENTS

| | | | |
|---|---|---|---|
| 6,381,360 B1* | 4/2002 | Sogawa | 382/154 |
| 6,819,869 B2 | 11/2004 | Seo | |
| 7,092,015 B1* | 8/2006 | Sogawa | 348/222.1 |
| 7,280,147 B2* | 10/2007 | Kitajima et al. | 348/345 |
| 7,386,192 B2* | 6/2008 | Oota | 382/300 |
| 7,561,191 B2* | 7/2009 | May et al. | 348/240.2 |
| 2003/0072569 A1 | 4/2003 | Seo | |
| 2005/0265633 A1* | 12/2005 | Piacentino et al. | 382/302 |
| 2005/0280801 A1* | 12/2005 | Gonzalez-Banos et al. | 356/4.07 |

FOREIGN PATENT DOCUMENTS

| | | | |
|---|---|---|---|
| JP | 2001-8235 A | | 1/2001 |
| JP | 2001-194114 A | | 7/2001 |
| JP | 2001-264033 | * | 9/2001 |
| JP | 2001-264033 A | | 9/2001 |
| JP | 2003-121126 A | | 4/2003 |

* cited by examiner

Primary Examiner — Lin Ye
Assistant Examiner — Trung Diep
(74) Attorney, Agent, or Firm — Sughrue Mion, PLLC

(57) ABSTRACT

According to an aspect of the invention, since two range images (first and second range images) are individually generated by a first range image generating device and a second range image generating device by different methods, and one range image (a third range image) is generated on the basis of those range images, highly accurate range images are generated. Furthermore, as the first range image generating device and the second range image generating device commonly use image sensors, the increase in hardware size and in cost due to the use of two devices for generating range images can be restrained.

47 Claims, 25 Drawing Sheets

SA

SB

METHOD OF GENERATING RANGE IMAGES AND APPARATUS THEREFOR

BACKGROUND OF THE INVENTION

1. Field of the Invention

The present invention relates to a method of generating range images and an apparatus therefor, and more particularly to a method of generating range images by generating range images by using a stereo matching technique or the like and an apparatus therefor.

2. Description of the Related Art

As a range image generating apparatus, what generates range images by using a stereo matching technique is generally known. By a stereo matching technique, a set of stereo images are obtained by shooting subjects in the same spatial area with a plurality of image sensors (e.g. two image sensors) in different directions of the line of sight. When stereo images are obtained, the position of the image point on each stereo image for the same object point of a subject is detected as one or the other of corresponding points between the images, and the lag (parallax) between the corresponding points on the different images is detected. On the basis of this parallax, the distance to that object point is figured out according to the principle of trigonometry. By applying this processing to each object point of the subject, a range image the values of whose pixels are the distances to the different object points of the subject is generated.

A range image generating apparatus using such a stereo matching technique requires matching between the pixels of different images by detecting on each of the obtained stereo images image points matching the same object point of the subject as corresponding points. This detection of corresponding points has been accomplished by detecting characteristic parts of the subject appearing on each image, utilizing features of the pattern of the subject and the like. However, where the pattern of the subject is poor in contract such as monotone, it has few characteristic parts, thereby it may be difficult to adequately match pixels in different images. In view of this problem, it is proposed in Japanese Patent Application Laid-Open No. 2001-8235, Japanese Patent Application Laid-Open No. 2001-194114, Japanese Patent Application Laid-Open No. 2001-264033 and Japanese Patent Application Laid-Open No. 2003-121126 to facilitate detection of corresponding points even from a subject having only a few characteristic parts by irradiating the subject with infrared rays of a prescribed pattern and obtaining stereo images shot with those infrared rays and thereby to make it possible to adequately match pixels in the different images.

SUMMARY OF THE INVENTION

However, in order to irradiate the subject with infrared rays of a prescribed pattern, the configuration of the illuminating apparatus inevitably has to be complex, and accordingly the overall size of the apparatus cannot be made compact, making it difficult to reduce its manufacturing cost. Furthermore, where is necessary to accurately focus the pattern of infrared rays on the subject, the accuracy of matching of the pixels of stereo images of the elsewhere than the focused range, and accordingly it is impossible to generate a sufficiently accurate range image.

An object of the present invention, attempted in view of these circumstances, is to provide a method of generating range images that can provide highly accurate range images without inviting an increase in the size of the apparatus or making it expensive, and an apparatus therefor.

In order to achieve the object stated above, a range image generating apparatus according to a first aspect of the invention comprises: a plurality of image pickup units having an optical system which forms images of subjects and image sensors which capture the images of the subjects formed by the optical system with two-dimensionally arrayed light receiving elements as electric signals; a first image capturing device which captures from each of the plurality of image pickup units an image of the subject formed by light in a first wavelength range as a first image; a second image capturing device which captures from at least one of the plurality of image pickup units an image of the subject formed by light in a second wavelength range as a second image; a first range image generating device which generates a first range image having values of pixels as distance data indicating a distance on the basis of a plurality of first images captured by the first image capturing device; a second range image generating device which generates a second range image having values of pixels as distance data indicating a distance on the basis of a second image captured by the second image capturing device; a third range image generating device which generates a third range image on the basis of the first range image and the second range image; and a recording device which records the third range image onto a recording medium.

According to the invention, since two range images (first and second range images) are individually generated by a first range image generating device and a second range image generating device by different methods, and one range image (a third range image) is generated on the basis of those range images, highly accurate range images are generated. Furthermore, as the first range image generating device and the second range image generating device commonly use image sensors, the increase in hardware size and in cost due to the use of two devices for generating range images can be restrained.

According to a second aspect of the invention, the range image generating apparatus according to the first aspect further comprises a light radiating device which irradiates the subject with light in the second wavelength range, wherein the second image capturing device irradiates the subject with light in the second wavelength range by using the light radiating device and captures an image of the subject formed by the reflected light thereof as the second image.

According to the second aspect, the apparatus further comprises the light radiating device for obtaining the second image to be referenced by the second range image generating device, namely an image of the subject formed by light of the second wavelength range, and when capturing the second image the subject can be irradiated with the light in the second wavelength range from the light radiating device.

According to a third aspect of the invention, the range image generating apparatus according to the first or second aspect is characterized in that the first range image generating device is a range image generating device using a stereo matching technique which detects, from the plurality of first images, corresponding points indicating image points for the same object point, figures out the distance to the object point on the basis of the parallax of the corresponding points, and generates the first range image by using distance data indicating the distance as values of the pixels of the corresponding points.

According to the third aspect, the first range image generating device uses a method by which a range image is generated by a stereo matching technique from stereo images obtained by shooting the same spatial area in different directions of the line of sight, namely from first images.

According to a fourth aspect of the invention, the range image generating apparatus according to the first, second or third aspect is characterized in that the second range image generating device is a range image generating device using a TOF technique which figures out the distance to the object point having each pixel as the image point on the basis of the second image representing pixel values according to the length of time taken by the light of the second wavelength range to irradiate the subject and reach the image pickup units, and generates the second range image by using the distance data indicating the distance as the value of each pixel.

According to the fourth aspect, the second range image generating device uses a method of generating a range image by a time of flight (TOF) technique by which the distance to the object point of the subject is figured out by determining the length of time taken by the light of second wavelength range irradiating to and being reflected by the subject to reach the image pickup units on the basis of the second image.

According to a fifth aspect of the invention, the range image generating apparatus according to the first, second, third or fourth aspect is characterized in that the third range image generating device generates the third range image by interpolating the first range image with the second range image.

According to the fifth aspect, the first range image generated by the first range image generating device is interpolated with the second range image generated by the second range image generating device. Namely, the part in which distance data are insufficient in the first range image is supplemented by the second range image. Therefore, highly accurate range images can be generated.

According to a sixth aspect of the invention, the range image generating apparatus according to any one of the first through fifth aspects is characterized in that the third range image generating device generates the third range image by interpolating the distance data of pixels around the corresponding points detected for the first range image by the first range image generating device with the second range image.

According to the sixth aspect, even when there is a parallax between the first range image and the second range image, distance data lacking in the first range image are appropriately interpolated with the distance data of corresponding pixels in the second range image. Interpolation processing can be thereby simplified and increased in speed.

According to a seventh aspect of the invention, the range image generating apparatus according to any one of the first through sixth aspects is characterized in that the first wavelength range is a visible wavelength range and the second wavelength range is a wavelength range including invisible light.

The seventh aspect provides an aspect in which images of the subject formed by light in the visible wavelength range are captured as first images and images of the subject formed by light in the wavelength range including invisible light are captured as second images.

According to an eighth aspect of the invention, the range image generating apparatus according to any of the first through seventh aspects is characterized in that the second wavelength range is an infrared wavelength range.

The eighth aspect provides an aspect in which the second images are captured by using infrared rays.

According to a ninth aspect of the invention, the range image generating apparatus according to any one of the first through eighth aspects is characterized in that in the image pickup unit which captures the first images with the first image capturing device, first pixel filters of a single type which transmit light of the first wavelength range or first pixel filters comprising a plurality of types which transmit a light in each of a plurality of wavelength ranges into which the first wavelength range is divided are arranged in the light receiving elements of the image sensors, and the first image capturing device captures the first images with the light receiving elements in which the first pixel filters are arranged; and characterized in that in the image pickup unit which captures the second images with the second image capturing device, second pixel filters which transmit light of the second wavelength range are arranged in the light receiving elements of the image sensors, and the second image capturing device captures the second images with the light receiving elements in which the second pixel filters are arranged.

The ninth aspect provides an aspect regarding the configuration of pixel filters of image sensors for capturing first images and second images by using light rays differing in wavelength range.

According to a tenth aspect of the invention, the range image generating apparatus according to the ninth aspect is characterized in that in the image pickup unit which captures the second images with the second image capturing device, a second wavelength range cut filter which cuts off light in the second wavelength range is detachably arranged on an optical path where light coming incident on the image sensors passes, the first image capturing device captures the first images in a state in which the second wavelength range cut filter is inserted into the optical path, and the second image capturing device captures the second images in a state in which the second wavelength range cut filter is kept away from the optical path.

According to the tenth aspect, it is made possible to eliminate the influence of light in the second wavelength range when capturing the first images, wherein a filter to cut off the second wavelength range is detachably arranged on the optical path.

According to an eleventh aspect of the invention, the range image generating apparatus according to the ninth or tenth aspect is characterized in that in the image pickup unit which captures the second images with the second image capturing device, the second pixel filters arranged in the light receiving elements of the image sensors are first pixel filters of a prescribed type having filtering characteristics to transmit light of the second wavelength range.

According to the eleventh aspect, in the image pickup unit which captures the second images, first pixel filters for capturing the first images are made to have filtering characteristics which enable these filters also to serve as second pixel filters for capturing the second images. Namely, these second pixel filters have characteristics to transmit both light of the first wavelength range (whole or partial) and light of the second wavelength range.

According to a twelfth aspect of the invention, the range image generating apparatus according to the eleventh aspect is characterized in that the first wavelength range is a visible wavelength range, and the first pixel filters comprise pixel filters transmitting light of the red wavelength range, pixel filters transmitting light of the green wavelength range and pixel filters transmitting light of the blue wavelength range.

The twelfth aspect provides an aspect in which pixel filters for capturing the first images comprise three types of pixel filters transmitting red, green and blue wavelength ranges.

According to a thirteenth aspect of the invention, the range image generating apparatus according to the eleventh or twelfth aspect is characterized in that the prescribed type of first pixel filters having filtering characteristics to transmit light of the second wavelength range are pixel filters which transmit light of the red wavelength range.

The thirteenth aspect provides an aspect in which the first pixel filters transmitting light of the red wavelength range are enabled to serve as second pixel filters which capture the second images by providing them with characteristics to transmit light of the second wavelength range as well.

According to a fourteenth aspect of the invention, the range image generating apparatus according to the eleventh or twelfth aspect is characterized in that the prescribed type of first pixel filters having filtering characteristics to transmit light of the second wavelength range are all the types of first pixel filters.

The fourteenth aspect provides an aspect in which the first pixel filters of all the types in the image pickup unit which captures the second images are enabled to serve as second pixel filters by providing them with characteristics to transmit light of the second wavelength range as well.

According to a fifteenth aspect of the invention, the range image generating apparatus according to any one of the eleventh through fourteenth aspects further comprises a second image correcting device which corrects the second images by subtracting, from the values of the pixels of the second images captured by the second image capturing device, values according to the values of the corresponding pixels of the first images captured by the first image capturing device from the same image pickup unit as the captured second images.

According to the fifteenth aspect, where the first pixel filters having characteristics to transmit light of the second wavelength range are to be used as the second pixel filters, the components of images picked up by light of the first wavelength range contained in the second images are enabled to be eliminated, and the accuracy of the second range image is enhanced accordingly.

According to a sixteenth aspect of the invention, the range image generating apparatus according to the fifteenth aspect is characterized in that the second image correcting device corrects the second images by subtracting the product of multiplying the value of the corresponding pixel in the first images by a prescribed value from the value of each pixel in the second images.

The sixteenth aspect presents a specific aspect for correcting the second images.

According to a seventeenth aspect of the invention, the range image generating apparatus according to the sixteenth aspect is characterized in that the prescribed value is set according to the ratio of the level of exposure at the time of picking up the second images and the level of exposure at the time of picking up the first images.

The seventeenth aspect presents an example of specific way of determining the prescribed value set forth in the sixteenth aspect.

According to an eighteenth aspect of the invention, the range image generating apparatus according to the ninth aspect is characterized in that in the image pickup unit into which the second images are captured by the second image capturing device, the second pixel filters are pixel filters arranged in different light receiving elements from the light receiving elements in which the first pixel filters are arranged.

According to the eighteenth aspect, in the image pickup unit into which the second images are captured, different light receiving elements capture the second images from the light receiving elements for capturing the first images. This arrangement dispenses with filters for cutting off light of the second wavelength range when capturing the first images, and enables the first images and the second images to be captured at the same time.

According to a nineteenth aspect of the invention, the range image generating apparatus according to the eighteenth aspect is characterized in that the first wavelength range is the green wavelength range and the first pixel filters are pixel filters which transmit light in the green wavelength range.

According to the nineteenth aspect, the first images are captured only by green pixels and the second images are enabled to be captured by the light receiving elements other than those in which green pixel filters are arrayed.

According to a twentieth aspect of the invention, the range image generating apparatus according to the eighteenth or nineteenth aspect is characterized in that the second wavelength range is the infrared wavelength range and the second pixel filters are pixel filters which transmit light in the infrared wavelength range.

The twentieth aspect presents a form of second wavelength range and second pixel filters to capture the second images, wherein the second images are to be captured as infrared images.

According to a twenty-first aspect of the invention, the range image generating apparatus according to the eighteenth, nineteenth or twentieth aspect is characterized in that in the image pickup unit into which the second images are captured by the second image capturing device, the first pixel filters and the second pixel filters are arranged alternately.

The twenty-first aspect presents an example of pixel filter arrangement.

According to a twenty-second aspect of the invention, the range image generating apparatus according to the eighteenth, nineteenth, twentieth or twenty-first aspect is characterized in that in the image pickup unit into which the second images are captured by the second image capturing device, the image sensors are so configured that each of the light receiving elements is connected changeably between the electric charge discharging side and the electric charge transferring side via electrical switches.

The twenty-second aspect presents a form of image sensor configuration.

According to a twenty-third aspect of the invention, the range image generating apparatus according to the twenty-second aspect is characterized in that the electrical switches are independently controlled by the light receiving elements in which the first pixel filters are arranged and the light receiving elements in which the second pixel filters are arranged.

According to the twenty-third aspect, the light receiving elements in which the first pixel filters are arranged and the light receiving elements in which the second pixel filters are arranged are enabled to be separately controlled from each other, and the first images and the second images can be captured each at a desired timing.

According to a twenty-fourth aspect of the invention, the range image generating apparatus according to any one of the eighteenth through twenty-third aspects is characterized in that the image pickup unit into which the second images are captured by the second image capturing device is so configured as to prevent the light receiving elements in which the first pixel filters are arranged and the light receiving elements in which the second pixel filters are arranged from overlapping each other in the period of exposure.

According to the twenty-fourth aspect, as the first images and the second images are separately captured, overlapping of power consumption by each of them can be avoided and noise and the like due to a momentary increase in power consumption can be prevented.

According to a twenty-fifth aspect of the invention, the range image generating apparatus according to the twenty-fourth aspect further comprises a light radiating device which irradiates the subject with light in the second wavelength range, wherein the subject is irradiated by the light radiating device with light in the second wavelength range during the exposure period of the light receiving elements in which the second pixel filters are arranged and the irradiation with light by the light radiating device is suspended during the exposure period of the light receiving elements in which the first pixel filters are arranged.

According to the twenty-fifth aspect, the influence of the light radiating device on the first images of light in the second wavelength range can be prevented.

According to a twenty-sixth aspect of the invention, the range image generating apparatus according to the twenty-fifth aspect is characterized in that exposure of the light receiving elements in which the first pixel filters are arranged is not executed in the period in which the light radiating device is radiating light and in the period over which the reflected light of the light from the light radiating device arrives.

The twenty-sixth aspect takes into consideration the length of time taken by the reflected light of the light from the light radiating device to reach the image sensors.

According to a twenty-seventh aspect of the invention, the range image generating apparatus according to any one of the first through twenty-sixth aspects is characterized in that the recording device records the first image captured from one image pickup unit out of the plurality of image pickup units onto the recording medium together with the third range image.

The twenty-seventh aspect allows recording of not only range images but also ordinary images.

According to a twenty-eighth aspect of the invention, the range image generating apparatus according to the twenty-seventh aspect is characterized in that a first camera unit having an image pickup unit into which first images to be recorded onto the recording medium are captured and a second camera unit having other image pickup units than this image pickup unit are made separable.

The twenty-eighth aspect enables, when recording of range images is not required, the user to separate the first camera unit from the second camera unit and carry only the first camera unit to record ordinary images.

A method of generating range images according to a twenty-ninth aspect of the invention comprises a first image capturing step of capturing, from each of a plurality of image pickup units having an optical system which forms images of subjects and image sensors which capture the images of the subjects formed by the optical system with two-dimensionally arrayed light receiving elements as electric signals, an image of the subject formed by light in a first wavelength range as a first image; a second image capturing step of capturing from at least one of the plurality of image pickup units an image of the subject formed by light in a second wavelength range as a second image; a first range image generating step of generating a first range image having the values of pixels as distance data indicating a distance on the basis of a plurality of first images captured at the first image capturing step; a second range image generating step of generating a second range image having the values of pixels as distance data indicating a distance on the basis of second images captured at the second image capturing step; a third range image generating step of generating a third range image on the basis of the first range image and the second range image; and a recording step of recording the third range image onto a recording medium.

According to a thirtieth aspect of the invention, the range image generating method according to the twenty-ninth aspect wherein in the second image capturing step, the subject is irradiated with light in the second wavelength range by a light radiating device which irradiates the subject with light in the second wavelength range, and an image of the subject formed by the reflected light thereof is captured as the second image.

According to a thirty-first aspect of the invention, the range image generating method according to the twenty-ninth or thirtieth aspect is characterized in that the first range image generating step is a range image generating step using a stereo matching technique which detects, from the plurality of first images, corresponding points indicating image points for the same object point, figures out the distance to the object point on the basis of the parallax of the corresponding points, and generates the first range image by using distance data indicating the distance as values of the pixels of the corresponding points.

According to a thirty-second aspect of the invention, the range image generating method according to the twenty-ninth, thirtieth or thirty-first aspect is characterized in that the second range image generating step is a range image generating step using a TOF technique which figures out the distance to the object point having each pixel as the image point on the basis of the second image representing pixel values according to the length of time taken by the light of the second wavelength range to irradiate the subject and reach the image pickup units, and generates the second range image by using the distance data indicating the distance as the value of each pixel.

According to a thirty-third aspect of the invention, the range image generating method according to the twenty-ninth, thirtieth, thirty-first or thirty-second aspect is characterized in that in the third range image generating step, the third range image is generated by interpolating the first range image with the second range image.

According to a thirty-fourth aspect of the invention, the range image generating method according to any one of the twenty-ninth through thirty-third aspects wherein in the third range image generating step, the third range image is generated by interpolating the distance data of pixels around the corresponding points detected for the first range image at the first range image generating step with the second range image.

According to a thirty-fifth aspect of the invention, the range image generating method according to any one of the twenty-ninth through thirty-fourth aspects is characterized in that the first wavelength range is a visible wavelength range and the second wavelength range is a wavelength range including invisible light.

According to a thirty-sixth aspect of the invention, the range image generating method according to any one of the twenty-ninth through thirty-fifth aspects is characterized in that the second wavelength range is an infrared wavelength range.

According to a thirty-seventh aspect of the invention, the range image generating method according to any one of the twenty-ninth through thirty-sixth aspects is characterized in that in the image pickup unit which captures the first images by the first image capturing step, first pixel filters of a single type which transmit light of the first wavelength range or first pixel filters comprising a plurality of types which transmit each of a plurality of wavelength ranges into which the first wavelength range is divided are arranged in the light receiving elements of the image sensors, and the first images are captured with the light receiving elements in which the first pixel filters are arranged in the first image capturing step, and characterized in that in the image pickup unit which captures the second images at the second image capturing step, second pixel filters which transmit light of the second wavelength range are arranged in the light receiving elements of the image sensors, and the second images are captured with the light receiving elements in which the second pixel filters are arranged in the image capturing step.

According to a thirty-eighth aspect of the invention, the range image generating method according to the thirty-seventh aspect is characterized in that in the image pickup unit which captures the second images in the second image capturing step, a second wavelength range cut filter which cuts off light in the second wavelength range is detachably arranged on an optical path where light coming incident on the image sensors passes, in the first image capturing step, the first images are captured in a state in which the second wavelength range cut filter is inserted into the optical path, and in the second image capturing step, the second images are captured in a state in which the second wavelength range cut filter is kept away from the optical path.

According to a thirty-ninth aspect of the invention, the range image generating method according to the thirty-seventh or thirty-eighth aspect is characterized in that in the image pickup unit which captures the second images by the second image capturing step, the second pixel filters arranged in the light receiving elements of the image sensors are first pixel filters of a prescribed type having filtering characteristics to transmit light of the second wavelength range.

According to a fortieth aspect of the invention, the range image generating method according to the thirty-ninth aspect is characterized in that the first wavelength range is a visible wavelength range and the first pixel filters comprise pixel filters transmitting light of the red wavelength range, pixel filters transmitting light of the green wavelength range and pixel filters transmitting light of the blue wavelength range.

According to a forty-first aspect of the invention, the range image generating method according to the thirty-ninth or fortieth aspect is characterized in that the prescribed type of first pixel filters having filtering characteristics to transmit light of the second wavelength range are pixel filters which transmit light of the red wavelength range.

According to a forty-second aspect of the invention, the range image generating method according to the thirty-ninth or fortieth aspect is characterized in that the prescribed type of first pixel filters having filtering characteristics to transmit light of the second wavelength range are all the types of first pixel filters.

According to a forty-third aspect of the invention, the range image generating method according to any one of the thirty-ninth through forty-second aspects further comprises a second image correcting step of correcting the second images by subtracting, from the values of the pixels of the second images captured in the second image capturing step, values according to the values of the corresponding pixels of the first images captured at the first image capturing step from the same image pickup unit as the captured second images.

According to a forty-fourth aspect of the invention, the range image generating method according to the forty-third aspect is characterized in that in the second image correcting step, the second images are corrected by subtracting the product of multiplying the value of the corresponding pixel in the first images by a prescribed value from the value of each pixel in the second images.

According to a forty-fifth aspect of the invention, the range image generating method according to the forty-fourth aspect is characterized in that the prescribed value is set according to the ratio of the level of exposure at the time of capturing the second images and the level of exposure at the time of capturing the first images.

According to a forty-sixth aspect of the invention, the range image generating method according to the thirty-seventh aspect is characterized in that in the image pickup unit into which the second images are captured in the second image capturing step, the second pixel filters are pixel filters arranged in different light receiving elements from the light receiving elements in which the first pixel filters are arranged.

According to a forty-seventh aspect of the invention, the range image generating method according to the forty-sixth aspect is characterized in that the first wavelength range is the green wavelength range and the first pixel filters are pixel filters which transmit light in the green wavelength range.

According to a forty-eighth aspect of the invention, the range image generating method according to the forty-sixth or forty-seventh aspect is characterized in that the second wavelength range is the infrared wavelength range and the second pixel filters are pixel filters which transmit light in the infrared wavelength range.

According to a forty-ninth aspect of the invention, the range image generating method according to the forty-sixth, forty-seventh or forty-eighth aspect is characterized in that in the image pickup unit into which the second images are captured by the second image capturing device, the first pixel filters and the second pixel filters are arranged alternately.

According to a fiftieth aspect of the invention, the range image generating method according to the forty-sixth, forty-seventh, forty-eighth or forty-ninth aspect is characterized in that in the image pickup unit into which the second images are captured in the second image capturing step, the image sensors are so configured that each of the light receiving elements is connected switchably to the electric charge discharging side and the electric charge transferring side via electrical switches.

According to a fifty-first aspect of the invention, the range image generating method according to the fiftieth aspect is characterized in that the electrical switches are independently controlled by the light receiving elements in which the first pixel filters are arranged and the light receiving elements in which the second pixel filters are arranged.

According to a fifty-second aspect of the invention, the range image generating method according to any one of the forty-sixth through fifty-first aspects is characterized in that the image pickup unit into which the second images are captured by the second image capturing step is so configured as to prevent the light receiving elements in which the first pixel filters are arranged and the light receiving elements in which the second pixel filters are arranged from overlapping each other in the period of exposure.

According to a fifty-third aspect of the invention, the range image generating method according to the fifty-second aspect is characterized in that the subject is irradiated with light in the second wavelength range by a light radiating device, which irradiates the subject with light in the second wavelength range during the exposure period of the light receiving elements in which the second pixel filters are arranged, and the irradiation with light by the light radiating device is suspended during the exposure period of the light receiving elements in which the first pixel filters are arranged.

According to a fifty-fourth aspect of the invention, the range image generating method according to the fifty-third aspect is characterized in that exposure of the light receiving elements in which the first pixel filters are arranged is not executed in the period in which the light radiating device is radiating light and in the period over which the reflected light of the light from the light radiating device arrives.

According to a fifty-fifth aspect of the invention, the range image generating method according to any one of the twenty-ninth through fifty-fourth aspects is characterized in that in the recording step, the first image captured from one image pickup unit out of the plurality of image pickup units is recorded onto the recording medium together with the third range image.

The twenty-ninth through fifty-fifth aspects of the invention so far described are inventions of methods respectively corresponding to the inventions of apparatuses in the first through twenty-eighth aspects, and provide similar effects to the respectively corresponding apparatuses.

According to the invention, highly accurate range images can be generated without inviting an increase in the size of the apparatus or making it expensive.

BRIEF DESCRIPTION OF THE DRAWINGS

FIG. 13 shows the pixel filter arrangement in the image sensor SB of the image pickup unit PB in a case in which the infrared cut filter of the image pickup unit PB is dispensed with;

FIG. 15 is a block diagram showing the internal configuration of the camera in a case in which the infrared cut filter of the image pickup unit PB is dispensed with;

FIG. 16 is a flow chart showing the processing procedure of range image generation in the camera in which the infrared cut filter of the image pickup unit PB is dispensed with;

DETAILED DESCRIPTION OF THE PREFERRED EMBODIMENTS

A distance range generating method and an apparatus therefor, which constitute preferred embodiments of the invention, will be described below with reference to accompanying drawings.

Figure 1:
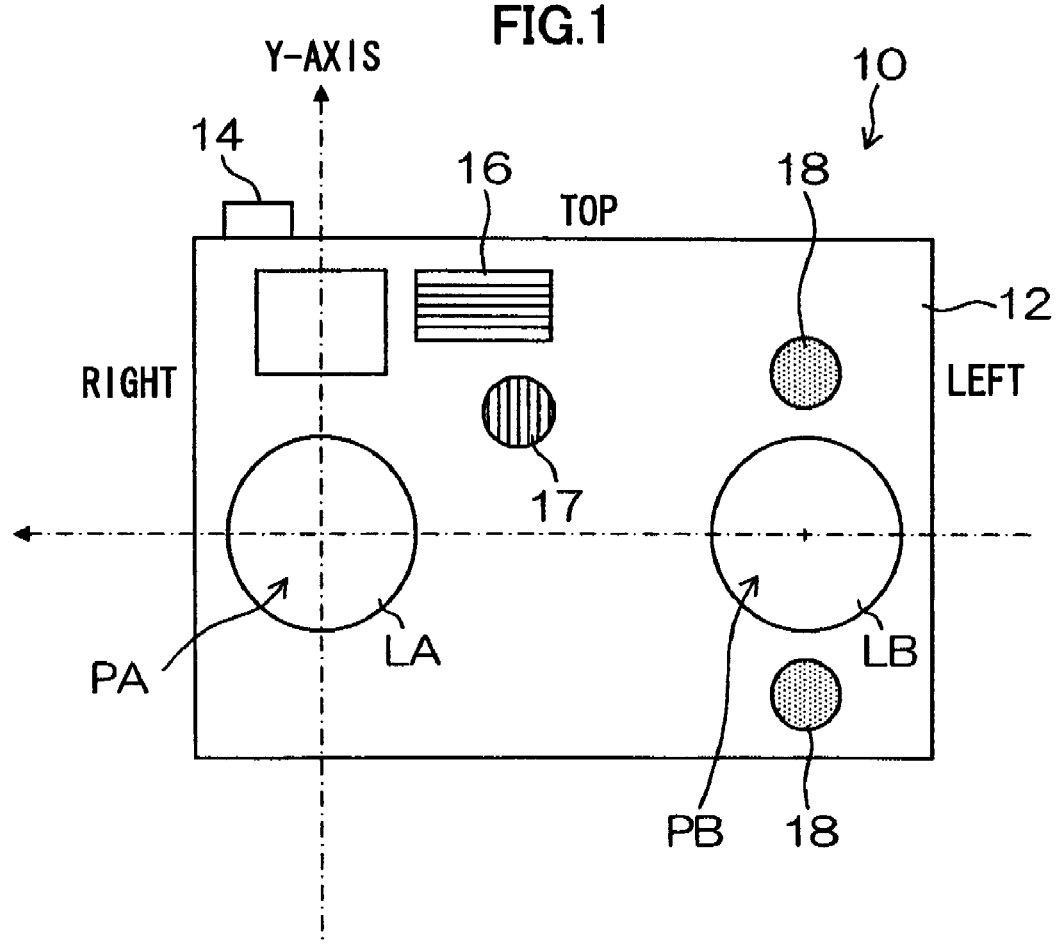
FIG. 1 shows a front view of the external configuration of a camera (image pickup device) into which a subject range generating apparatus according to the invention is incorporated.

FIG. 1 shows a front view of the external configuration of a camera (image pickup device) into which a subject range generating apparatus according to the invention is incorporated. A camera 10 in this drawing, like a usual digital still camera, has a function to pick up images of subjects formed by visible light and record the images onto a recording medium or the like and a function to generate range images the values of whose pixels are distances to the subjects by using a stereo matching technique and an infrared ray-based time of flight (TOF) technique to be described afterwards and record the range images onto the recording medium or the like. Incidentally, a recorded image in the context of this specification refers to a usual image by visible light recorded in the recording medium.

As shown in this drawing, the body 12 of the camera 10 is equipped with two image pickup units including the main image pickup unit PA and the auxiliary image pickup unit PB, and these image pickup units PA and PB are respectively provided with image pickup lenses (image pickup optical systems) LA and LB for forming subjects and image sensors SA and SB (shown in FIG. 3) formed of, solid state image pickup elements such as CCDs, for instance.

Figure 3:
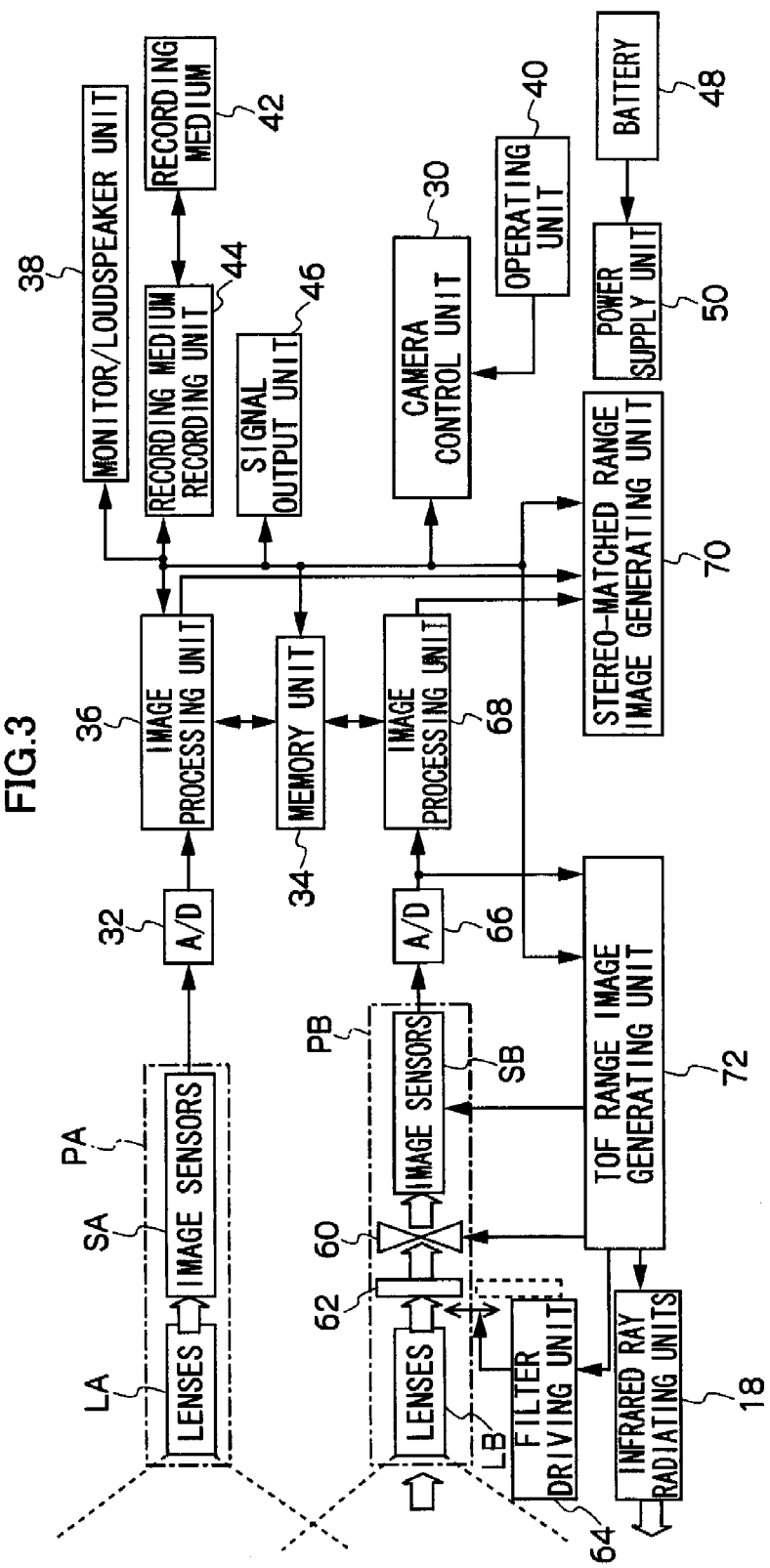
FIG. 3 is a block diagram showing the internal configuration of the camera of FIG. 1.

The image pickup unit PA is used in the same way as a usual digital still camera which picks up an image (still image) of visible light with a single image pickup unit, and the body 12 of the camera 10 is equipped with constituent units which, like their counterparts in a usual digital still camera, are intended to pick up images of visible light with the image pickup unit PA and records the images onto a recording medium 42 (shown in FIG. 3). Although delving into fine details is avoided here, for instance, a shutter release button 14 to instruct capturing of an image or the like, a stroboscope 16 which emits illuminating light in the visible light spectrum when the subject is dark, and a self-timer lamp 17 for notifying the timing of shutter release when the shutter release is to be self-timed. Further, a liquid crystal monitor capable of displaying an image as an electronic view finder, and a card slot into which the recording medium (memory card) 42 for recording data including images of visible light picked up with the image pickup unit PA and range images to be described afterwards is to be inserted are disposed on the rear and side faces of the body 12 of the camera 10.

On the other hand, the image pickup unit PB, used for generating range images, captures images of visible light in a direction of line of sight different from the image pickup unit PA as will be further described afterwards. This enables two images captured by the image pickup unit PA and the image pickup unit PB are used as stereo images for the generation of range images by the stereo matching technique. Further, infrared ray radiating units 18 and 18 which emit infrared rays are disposed above and underneath the image pickup lens LB of the image pickup unit PB, and an image formed by the infrared rays (light containing infrared rays) emitted from these infrared ray radiating units 18 and 18 to irradiate the subject and reflected is captured by the image pickup unit PB. The image formed by the infrared rays is used for range image generation by the time of flight (TOF) technique which uses infrared rays. The range image by the TOF technique is used for interpolation of range images by the stereo matching technique as will be further described afterwards. The number of the infrared ray radiating units 18 need not be two, but three or more, or one instead.

Figure 2:
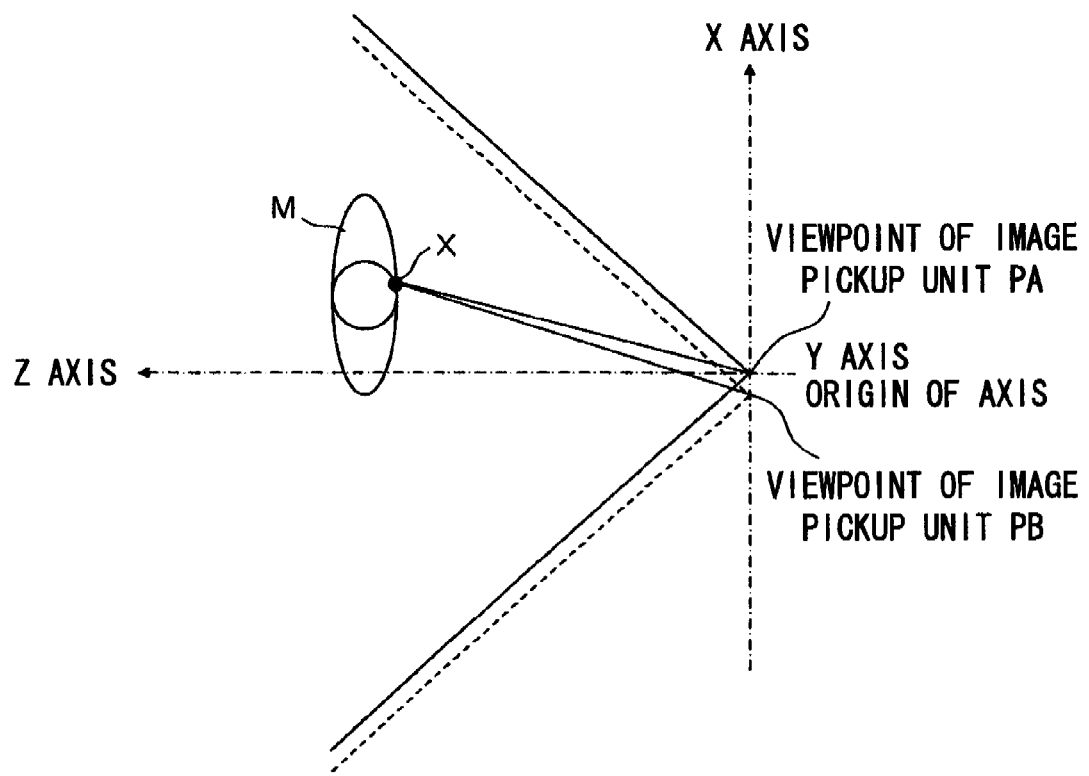
FIG. 2 is a subject field top view showing the relationship among the viewpoints of two image pickup units PA and PB in the camera of FIG. 1 and the subject.

FIG. 2 is a subject field top view of the relationship among the viewpoints of two image pickup units PA and PB and the subject. In this drawing, the coordinates of the subject field space are defined by selecting the viewpoint of the image pickup unit PA of the camera 10 as the origin, and setting the optical axis of the image pickup unit PA as the Z axis, the X axis in the direction of the straight line linking the viewpoint (the origin) of the image pickup unit PA and the viewpoint of the image pickup unit PB, and the Y axis (see FIG. 1) in a direction perpendicular to the paper surface orthogonal to the X axis and to the Z axis. The positions of the viewpoint of the image pickup unit PA and the viewpoint of the image pickup unit PB differ in the X axis direction as shown in this drawing, and images of the same object point X on a subject (a person in this drawing) M in the subject field space seen from these viewpoints at different angles are captured by the image pickup units PA and PB. As a result, a lag (parallax) arises between the positions of image points relative to the same object point X in the images captured by the image pickup units PA and PB, and the distance to that object point X is figured out according to the principle of trigonometry by figuring out that parallax. Incidentally, between images shot by the image pickup unit PA and the image pickup unit PB, positions (pixels) which constitute image points relative to the same object point will be referred to as corresponding points. Further, though it is also possible to figure out the distance data of each pixel in a range image to be generated as the distance from the viewpoint of the image pickup unit PA to each object point, it will be figured out in this embodiment as the distance in the Z axis direction (depth direction).

FIG. 3 shows the internal configuration of the camera 10. In this diagram, the constituent units making up the camera 10 are under integrated control by a camera control unit 30, and the operations of the constituent units to be described below are performed in accordance with instructions or the like from the camera control unit 30.

The image pickup unit PA, which is the main image pickup unit, is provided with the image pickup lenses (image pickup optical systems) LA and the image sensors SA formed of solid state image pickup elements, such as CCDs, as illustrated in this FIG. 3. When light in the visible light spectrum from a subject comes incident on the image pickup lenses LA, an image of the subject is formed by the image pickup lenses LA on the light receiving faces of the image sensors SA. Then, the image is picked up (photoelectrically converted) by the image sensors SA to be converted into electric signals (image signals). This causes the image of the subject formed by visible light to be captured into the image pickup unit PA. Image signals which represent that image are outputted from the image sensors SA and, after being converted into digital signals by an A/D converter 32, are temporarily stored in a memory unit 34 and undergo required image processing, such as white balance correction, gamma correction and contour correction, by an image processing unit 36.

A monitor/loudspeaker unit 38 shown in FIG. 3 includes a liquid crystal monitor, a loudspeaker and controllers therefor, disposed on the body 12 of the camera 10 and, when a see-through image is to be displayed on that liquid crystal monitor, images of the subject are consecutively captured by the image pickup unit PA, and image signals successively outputted from the image sensors SA are consecutively processed by the image processing unit 36. Then the image signals processed by the image processing unit 36 and temporarily stored in the memory unit 34 are transferred to the monitor/loudspeaker unit 38 via a bus. Thereby, the image currently shot by the image pickup unit PA is displayed on the liquid crystal monitor as a see-through image.

On the other hand, when an image (an image by visible light, that is an image to be recorded) is to be recorded on the recording medium (memory card) 42 loaded into the card slot, an image of the subject is captured by the image pickup unit PA in response to a shooting instruction generated by the full pressing of the shutter release button 14 (see FIG. 1) included in an operating unit 40 shown in FIG. 3, and a one-frame equivalent of image signals are outputted from the image sensors SA. Those image signals are temporarily stored in the memory unit 34 and, after being processed by the image processing unit 36, transferred to a recording medium recording unit 44. In the recording medium recording unit 44, the image signals undergo processing such as compression, and are recorded onto the recording medium 42 as image data of a prescribed format.

When the image of the image data recorded in the recording medium 42 is to be reproduced and displayed on the liquid crystal monitor, after the image data are read out of the recording medium 42 in response to a prescribed reproduction instruction and decompressed or the like against the compression by the recording medium recording unit 44, the image data are transferred to the monitor/loudspeaker unit 38.

This causes the image of the image data recorded in the recording medium 42 to be reproduced and displayed on the liquid crystal monitor.

Incidentally, the operating unit 40 in this drawing includes various operational members including a power switch besides the shutter release button 14, and the reading of their operations by the camera control unit 30 causes processing corresponding to each operation to be executed. The shutter release button 14 is, for instance, a two-stroke button comprising a switch which is turned on when half-pressed to make shooting preparations for automatic focusing (AF) or automatic exposure control (AE) and another switch which is turned on when fully pressed to capture an image. From a signal output unit 46 also shown in FIG. 3, image signals of the image displayed on the liquid crystal monitor and image data and the like recorded in the recording medium 42 can be outputted to external instruments. Furthermore, the camera 10 is detachably loaded with a battery 48, and the power of the battery 48 is fed to various constituent units from a power supply unit 50.

The image pickup unit PB which is the auxiliary image pickup unit, like the image pickup unit PA, has image pickup lenses LB and image sensors SB formed of solid state image pickup elements, such as CCDs, and the like as illustrated in FIG. 3. The image pickup unit PB is also provided with an electro-optical shutter 60 which can control transmission or non-transmission of light by applying a prescribed voltage to the optical path between the image pickup lenses LB and the image sensors SB and, on that optical path, a detachable infrared cut filter 62.

As the electro-optical shutter 60, for instance a liquid crystal shutter whose transmissivity varies with the applied voltage is used, and an open state in which light is transmitted and a closed state in which light is intercepted are switched over between each other by the applied voltage. Incidentally, the electro-optical shutter 60 is used when images are captured for the purpose of generating a range image by a TOF technique to achieve high-speed switching between the open state and the closed state. Therefore, where the need can be satisfied by the electronic shutter function of the image sensors SB, the electro-optical shutter 60 is not always required.

The infrared cut filter 62, which cuts off infrared rays, is moved by the motor of a filter driving unit 64 or the like between the position it is inserted into the optical path and the position it goes away from the optical path. When the infrared cut filter 62 is inserted into the optical path, infrared rays out of the light rays having passed the image pickup lenses LB are removed, and only visible light rays come incident on the image sensors SB.

Capturing of images by the image pickup unit PB is so accomplished that a plurality of image frames are captured in response to a shooting instruction by fully pressing the shutter release button 14 once. Capturing of a single image frame is accomplished in a state in which the infrared cut filter 62 is inserted into the optical path. At this time, the electro-optical shutter 60 is set to an open state, but no infrared rays are radiated from the infrared ray radiating units 18. At the time of the image capturing, as light from the subject having come incident on the image pickup lenses LB is cleared by the infrared cut filter 62 of its infrared ray component, the image of the subject is formed on the light receiving face of the image sensors SB only by visible light. Then, the image is picked up (photoelectrically converted) by the image sensors SB to be converted into electric signals (image signals). This causes the image of the subject formed by visible light to be captured into the image pickup unit PB. Image signals which represent that image are outputted from the image sensors SB and, after being converted into digital signals by an A/D converter 66, are temporarily stored in the memory unit 34 and undergo required image processing, such as white balance correction, gamma correction and contour correction, by an image processing unit 68. The image captured by the image pickup unit PB in this way and the image captured by the image pickup unit PA are captured into a stereo-matched range image generating unit 70 as two images to constitute a stereo image resulting from the shooting of the same subject from the directions of different lines of sight. Then, the stereo-matched range image generating unit 70 generates by a stereo matching technique range images the values of whose pixels are the distances to different object points of the subject.

On the other hand, capturing of the other image by the image pickup unit PB is accomplished by controlling the electro-optical shutter 60 (switching between an open state and a closed state) in a state in which the infrared cut filter 62 is kept away from the optical path. Then, infrared rays are emitted from the infrared ray radiating units 18. When capturing the image, light rays from the subject coming incident on the image pickup lenses LB contain infrared rays from the infrared ray radiating units 18 having irradiated and been reflected by the subject. The light from the subject coming incident on the image pickup lenses LB forms an image of the subject in a state of containing infrared rays. This image formed by the light containing infrared rays is picked up by the image sensors SB and converted into electric signals (image signals). This causes the image formed by the light containing infrared rays radiated from the infrared ray radiating units 18 (hereinafter this image formed by the light containing infrared rays will be referred to as infrared image) is captured by the image pickup unit PB. The image signals representing that infrared image are outputted from the image sensors SB and, after being converted by the A/D converter 66 into digital signals, is captured into a TOF range image generating unit 72. In that TOF range image generating unit 72, a range image the values of whose pixels are the distances to different object points of the subject is generated by a TOF technique.

Figure 4:
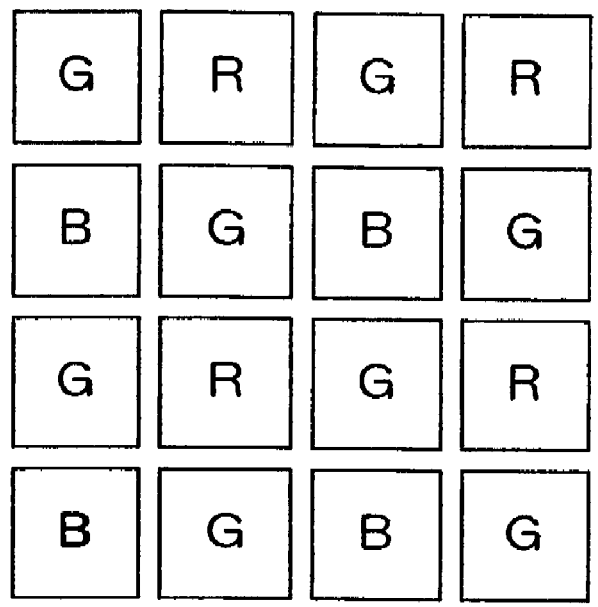
FIG. 4 shows the pixel filter arrangement in the image sensor SA of the image pickup unit PA.
Figure 5:
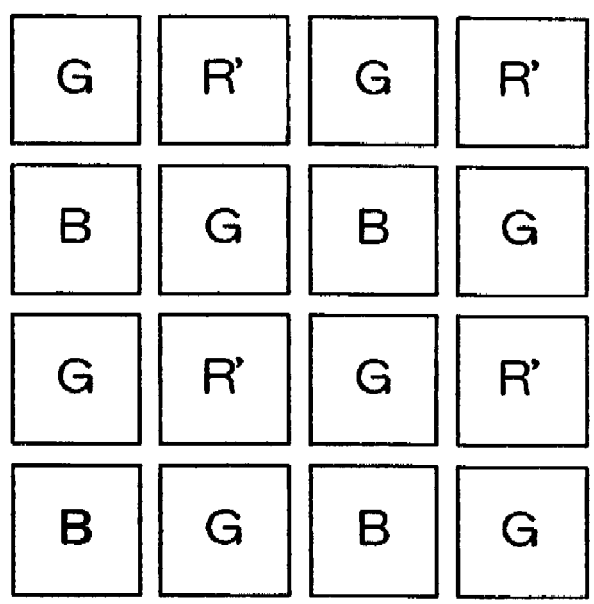
FIG. 5 shows the pixel filter arrangement in the image sensor SB of the image pickup unit PB.

The pixel filter arrangements of the image sensors SA and SB in these image pickup units PA and PB are shown in FIG. 4 and FIG. 5, respectively. FIG. 4 shows the arrangement of pixel filters disposed in the light receiving elements of pixels in the image sensors SA of the image pickup unit PA, wherein the pixel filters represented by R, G and B represent pixel filters transmitting light rays in the red, green and blue wavelength ranges, respectively. FIG. 5 shows the arrangement of pixel filters in the image sensors SB of the image pickup unit PB, wherein the pixel filters represented by R', G and B represent pixel filters transmitting light rays in the red, green and blue wavelength ranges, respectively.

The image sensors SA and the image sensors SB use image pickup elements having equivalent characteristics, and are identical in pixel pitch, number of pixels, basic pixel filter arrangement and the like.

Figure 6:
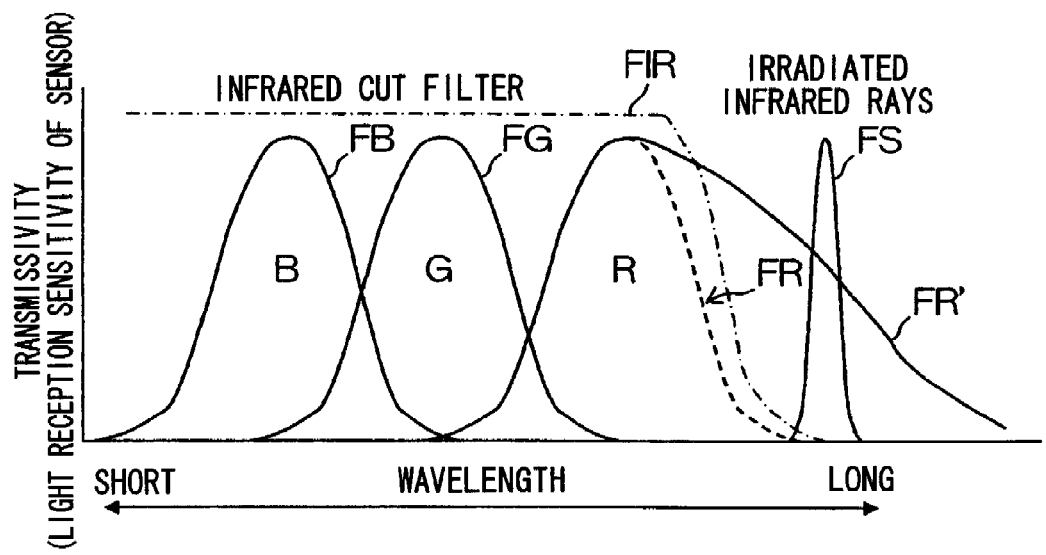
FIG. 6 shows the wavelength characteristics of pixel filters.

On the other hand, the R pixel filter of the image sensors SA and the R' pixel filter of the image sensors SB differ in filtering characteristics. FIG. 6 shows the wavelength characteristics of the R, G, B and R' pixel filters. The G and B pixel filters of the image sensors SA and the G and B pixel filters of the image sensor RB have respectively the same characteristics. As shown in this drawing, the G pixel filter has a wavelength peak achieving the highest transmissivity at a prescribed wavelength in the green wavelength range as indicated by a curve FG, and at that wavelength peak the light reception sensitivity of the light receiving element provided with the G pixel filter (the G light receiving element) reaches its maximum. The B pixel filter has a wavelength peak achieving the highest transmissivity at a prescribed wavelength in the blue wavelength range as indicated by a curve FB, and at that wavelength peak the light reception sensitivity of the light receiving element provided with the B pixel filter (the B light receiving element) reaches its maximum. These G and B pixel filters have similar characteristics to those of green and blue pixel filters used in ordinary image sensors.

Further, the R pixel filter of the image sensors SA has similar characteristics to that of a red pixel filter used in ordinary image sensors. As indicated by a curve FR (broken line), it has a wavelength peak achieving the highest transmissivity at a prescribed wavelength in the red wavelength range, and at that wavelength peak the light reception sensitivity of the light receiving element provided with the R pixel filter (the R light receiving element) reaches its maximum.

On the other hand, the R' pixel filter of the image sensors SB has substantially the same wavelength as the R pixel filter as its wavelength peak as indicated by a curve FR' and transmits light rays in the red wavelength range as does the R pixel filter. It further has a characteristic of transmitting light rays in the infrared wavelength range toward longer wavelengths. Therefore, the light receiving element provided with this R' pixel filter (the R' light receiving element) has a high light reception sensitivity to infrared rays as well.

FIG. 6 also shows a curve FS which represents the wavelength range of infrared rays emitted from the infrared ray radiating units 18 and curve FIR representing the filtering characteristics of the infrared cut filter 62 of the image pickup unit PB.

When images for generation of range images in the stereo-matched range image generating unit 70 as described above are to be captured by the image pickup unit PB, the images are captured in a state in which the infrared cut filter 62 is inserted into the optical path. Light from the subject then passes the infrared cut filter 62 and the R' pixel filter and comes incident on the R' light receiving element. For this reason, the light reception sensitivity of the R' light receiving element, like that of the R light receiving element of the image sensor SA, is limited by the red wavelength range. Thus, the R' light receiving element is equivalent to an element provided with a filter having the characteristics of the infrared cut filter 62 and those of the R' pixel filter superposed over one over the other, and its characteristics are similar to those of the R pixel filter. In contrast, the G and B light receiving elements of the image sensors SB are hardly affected by the infrared cut filter 62. Therefore, when an image is captured in a state in which the infrared cut filter 62 is inserted into the optical path, images by visible light picked up with characteristics equivalent to those of the image sensors SA are obtained by the image sensors SB.

On the other hand, when images for generating range images in the TOF range image generating unit 72 are to be captured by the image pickup unit PB, image capturing is accomplished in a state in which the infrared cut filter 62 is kept away from the optical path. In this process, the characteristics of the R' pixel filter of the image sensors SB are directly reflected. Although the subject is then irradiated with infrared rays from the infrared ray radiating units 18, the R' light receiving elements of the image sensors SB receive the infrared rays radiated from the infrared ray radiating units 18 and reflected by the subject because the R' pixel filter has a characteristic to transmit light rays of that infrared wavelength range. Therefore, when images are captured in a state in which the infrared cut filter 62 is kept away from the optical path and infrared rays are radiated from the infrared ray radiating units 18, images formed by light containing those infrared rays (infrared images) are obtained by the image sensors SB. Incidentally, the infrared images then captured are supposed to be images obtained from the R' light receiving elements.

Figure 7:
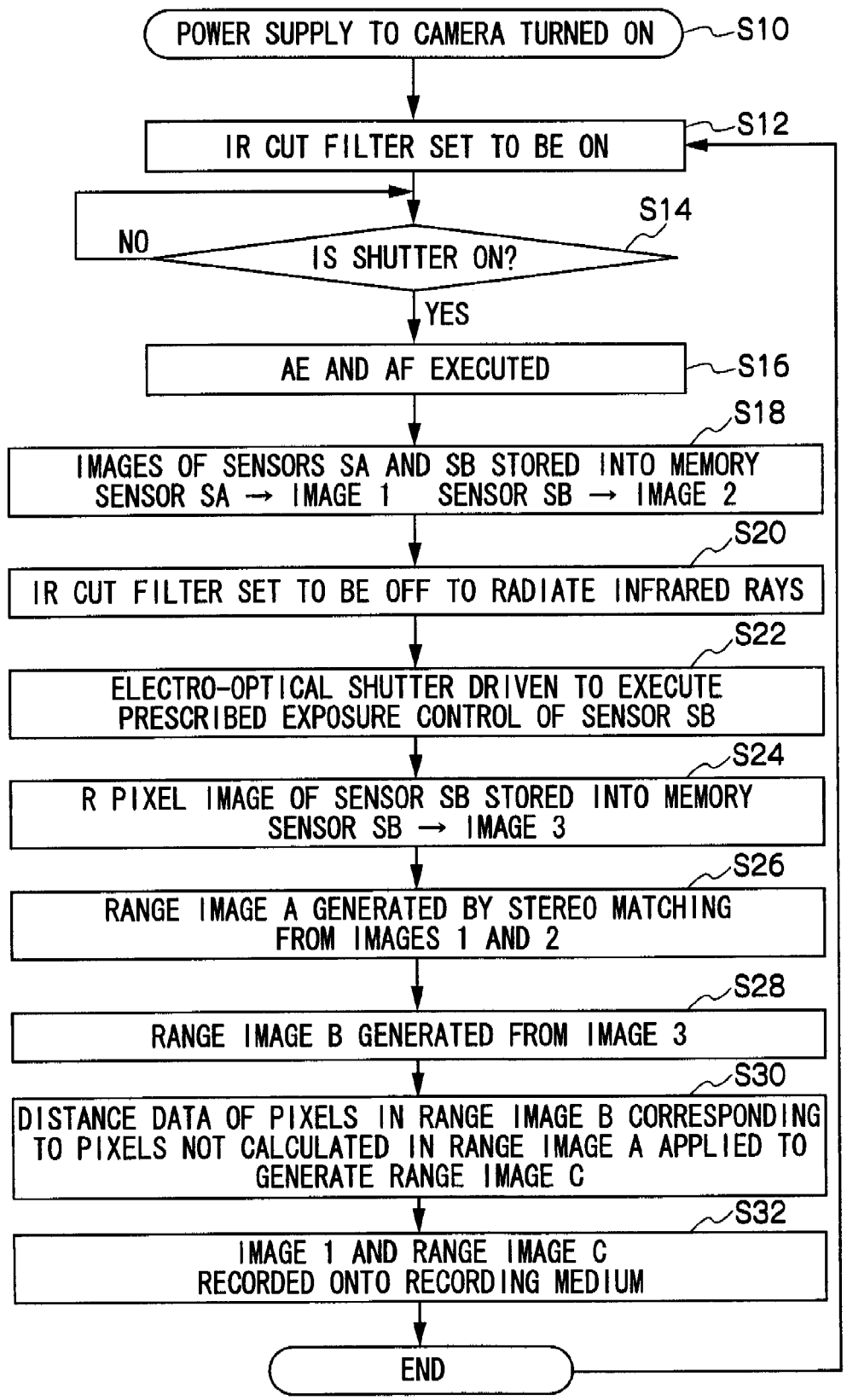
FIG. 7 is a flow chart showing the processing procedure of range image generation in the camera of FIG. 1.

Next, the procedure of range image generation in the camera 10 will be described with reference to the flow chart of FIG. 7. First, power supply to the camera 10 is turned on by operating a prescribed power switch (step S10), and the infrared cut filter 62 in the image pickup unit PB is inserted into the optical path (the infrared cut filter 62 turned on) (step S12). Then, it is determined whether or not the shutter release button 14 has been fully pressed (step S14). As long as the result is NO, this determination processing is repeated.

On the other hand, if the result of determination processing at step S14 is YES, AE and AF are processed (step S16). Then, images are captured by the image sensors SA of the image pickup unit PA and the image sensors SB of the image pickup unit PB, and stored into the memory unit 34 (step S18). Here, the image captured by the image sensors SA of the image pickup unit PA will be referred to as an image 1, and the image captured by the image sensors SB of the image pickup unit PB, as an image 2.

Next, the infrared cut filter 62 is kept away from the optical path (the infrared cut filter 62 turned off), and the subject is irradiated with infrared rays from the infrared ray radiating units 18 (step S20). Then, the electro-optical shutter 60 is driven to execute prescribed exposure control of the image sensors SB (step S22). This causes the image (infrared image) to be captured only from the R' light receiving elements of the image sensors SB and that image to be stored into the memory unit in the TOF range image generating unit 72 (step S24). The infrared image then captured by the image pickup unit PB is referred to as an image 3. Incidentally, the image 3 may as well be stored into the memory unit 34 like the images 1 and 2.

Next, the image 1 and the image 2 stored in the memory unit 34 are captured into the stereo-matched range image generating unit 70, and a range image A is generated by a stereo matching technique on the basis of those image 1 and image 2 (step S26).

In the stereo-matched range image generating unit 70 here, corresponding points which constitute the image points relative to the same object point in the image 1 and the image 2, for instance, are detected, and a positional lag (parallax) between the corresponding points in the image 1 and the image 2 is figured out. The distance to the object point is calculated from parallax according to the principle of trigonometry. This stereo matching processing is applied to each pixel in the image 1, and the range image A is generated by using the value of each pixel in the image 1 as the calculated distance value (distance data).

On the other hand, the TOF range image generating unit 72, on the basis of the pixel value of the image 3, calculates by the principle of a TOF technique the distance to the object point of the subject having that pixel as an image point, and generates a range image B whose pixel values are the distances so calculated (distance data) (step S28). For instance, the timing at which electric charges are effectively accumulated in each of the light receiving elements of the image sensors SB for the incident light is controlled (control of the electro-optical shutter 60 or an electronic shutter), the infrared ray radiating units 18 are caused to emit light in a prescribed period, and electric charges are effectively accumulated in each light receiving element of the image sensors SB at that timing of light emission. The quantity of electric charges accumulated in each light receiving element corresponds to the time of flight taken by infrared rays emitted from the infrared ray radiating units 18 to reach each light receiving element from the time it is emitted and after being reflected by the subject. Therefore, the distance to the object point having each pixel as its image points can be calculated by the values of pixels of the image 3 obtained by the light receiving elements (the R' light receiving elements) of the image sensors SB.

Incidentally, known methods of generating the range image B by a TOF technique include one in which pulse light is emitted from the infrared ray radiating units 18 and the timing of exposure to have each light receiving element of the image sensors SB effectively accumulate electric charges at the timing of this pulse light emission. In this case, the subject is irradiated with infrared rays from the infrared ray radiating units 18, and electric charges of a quantity corresponding to the time taken by the reflected rays to reach the light receiving elements of the image sensors SB are accumulated in each light receiving element. Thus, the quantity of charges accumulated in a light receiving element is greater at a shorter distance and smaller at a longer distance. Therefore, the distance to the object point having each pixel as its image points can be calculated on the basis of the values of pixels of the image 3 thereby obtained. The emission of pulse light by the infrared ray radiating units 18 and the corresponding exposure of the image sensors SB are repeated about three or four times.

Another method of generating the range image B by a TOF technique is to have the infrared ray radiating units 18 emit sine wave modulating light (radiated sine wave) and to repeat exposure of the light receiving elements of the image sensors SB a number of times (four times for instance) at the timing of the emission of that pulse light. In this case, a plurality of image frames are obtained as images 3, and a received sine wave received by each light receiving element is demodulated for the radiated sine wave on the basis of the pixel value of each pixel obtained. This enables the phase lag between the radiated sine wave and the received sine wave to be detected, and the distance to the object point having each pixel as its image points can be calculated on the basis of that phase lag. The value of each pixel of the image 3 obtained by this method represents a value corresponding to the length of time taken by the light rays irradiating the subject from the infrared ray radiating units 18 to be reflected by the subject and reach the image sensors SB, and this method is also covered by this specification as a form of TOF technique.

Then, the stereo-matched range image generating unit 70 acquires distance data regarding pixels whose distance failed to be calculated in the generation of the range image A at step S26 from corresponding pixels in the range image B generated by the TOF range image generating unit 72. The distance data acquired from the range image B are applied to the range image A to generate a range image C (step S30).

Upon completion of the processing described so far, the image 1 captured by the image pickup unit PA and the range image C are recorded onto the recording medium 42 (step S32), and the procedure returns to step S12.

The image 1 and the range image C may either be recorded as separate files related to each other or as data in a single file. The image 2 and the image 3 may also be recorded.

In the following description, images captured by the image pickup unit PA and images captured by the image pickup unit PB to generate the range image A in the stereo-matched range image generating unit 70 as described above will be referred to as images 1 and images 2, respectively, and images captured by the image pickup unit PB to generate the range image B in the TOF range image generating unit 72 will be referred to as images 3.

Next, a specific method of generating the range image C at step S30 of FIG. 7 will be described. The range image A generated by the stereo-matched range image generating unit 70 has as its distance data the values of pixels of the recorded image of visible light recorded in the recording medium 42, namely the image 1. On the other hand, as the image pickup unit PA and the image pickup unit PB differ in viewpoint, pixels to serve as corresponding points between the range image B generated from the image 3 captured by the image pickup unit PB in the TOF range image generating unit 72 and the range image A differ in position on the images.

Figure 8:
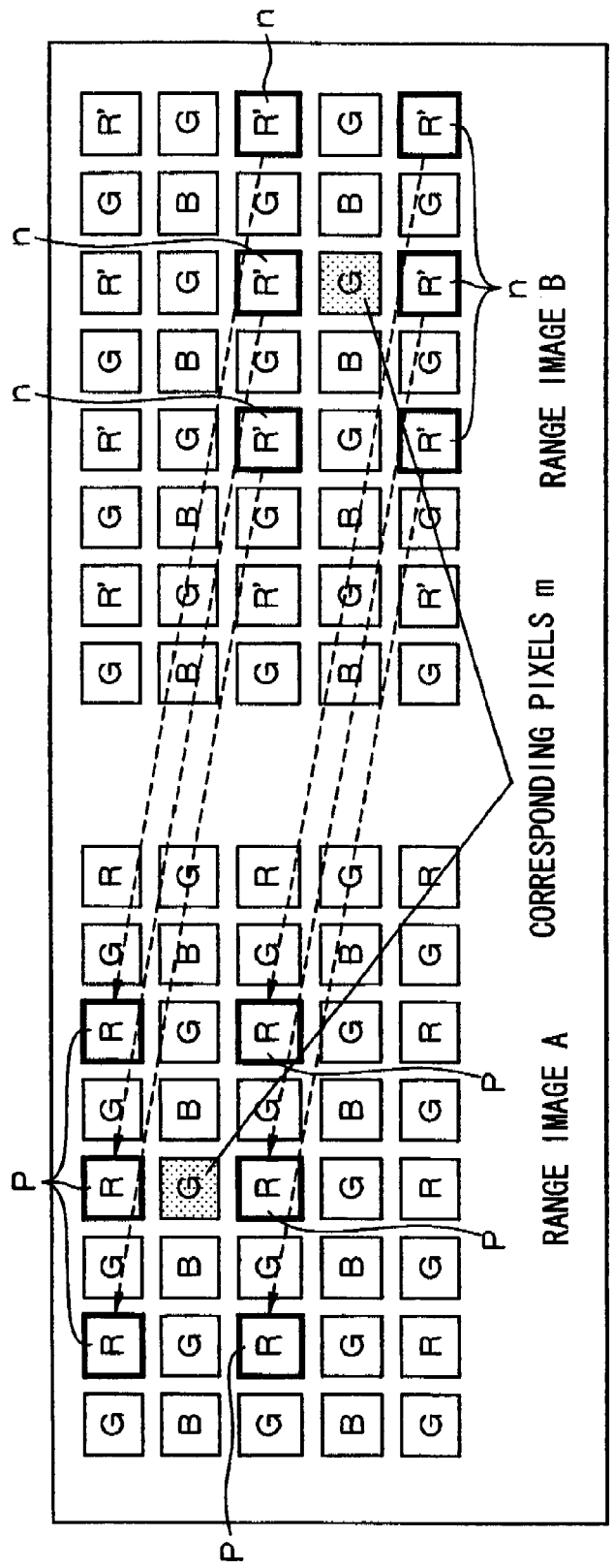
FIG. 8 shows pixels in the same scope in a whole image extracted from each of a range image A generated by a stereo-matched range image generating unit and a range image B by a TOF range image generating unit.

In view of this difference, when the range image A is generated in the stereo-matched range image generating unit 70, corresponding points figured out between the image 1 and the image 2 are utilized. FIG. 8 shows pixels in the same scope extracted from a whole image in each of the range image A generated by the stereo-matched range image generating unit 70 and the range image B generated by the TOF range image generating unit 72. In this diagram, each pixel in the range image A matches one or another pixel in the image 1, and the pixels represented by R, G and B (R pixels, G pixels and B pixels) represent the pixels matching the light receiving elements in which the R, G and B pixel filters are arranged in the image sensors SA of the image pickup unit PA in the pixel filter arrangement shown in FIG. 4. On the other hand, each pixel in the range image B matches one or another pixel in the image 2, and the pixels represented by R', G and B (R' pixels, G pixels and B pixels) represent the pixels matching the light receiving elements in which the R', the G and B pixel filters are arranged in the image sensors SB of the image pickup unit PB in the pixel filter array shown in FIG. 5.

For instance, it is supposed here that corresponding points (corresponding pixels) detected by the stereo-matched range image generating unit 70 are G pixels m in the range image A and the range image B in FIG. 8. Then, pixels around the corresponding pixels m are relatively free from lags. In view of this point, the distance data of R' pixels n around the corresponding pixels m of the range image B are matched with R pixels p around the corresponding pixels m of the range image A to interpolate missing parts in the distance data of the range image A. By repeating this interpolation for each of the corresponding points, an appropriate range image C relatively free from pixel lags is generated.

Incidentally, though six pixels around the corresponding pixels m are interpolated in FIG. 8, the scope of interpolation may be set appropriately.

Next, an embodiment to enhance the accuracy of distance calculation in the generation of the range image B in the TOF range image generating unit 72 will be described with reference to the flow chart of FIG. 9. In the flow chart of FIG. 9, steps of processing bearing the same step numbers as in the flow chart of FIG. 7 are as described with reference to FIG. 7. To dispense with the description of processing at steps S10 through S24 in FIG. 9, where the same processing takes place as in FIG. 7, the processing at step S40 after the capturing of the image 3 (infrared image) from the image pickup unit PB at step S24 is added.

At step S40, processing to eliminate the contribution of rays in the red wavelength range from the values of the pixels of the image 3 is performed. The image 3 captured by the image pickup unit PB is made up of pixels obtained by the R' light receiving elements of the image sensors SB (R' pixels). As described regarding the filtering characteristics of the R' pixel filter with reference to FIG. 4 through FIG. 6, a light receiving element in which an R' pixel filter is arranged has light reception sensitivity to infrared rays emitted from the infrared ray radiating units 18 and light rays in the red wavelength range. Therefore, the values of R' pixels are attributable not only to infrared rays but also to light rays in the red wavelength range which are superposed; when a distance is to be calculated by a TOF technique using infrared rays as reference rays, light rays in the red wavelength range may invite a drop in the accuracy of distance calculation.

On the other hand, in the image 2 captured by the image pickup unit PB in a state in which the infrared cut filter 62 is inserted into the optical path, the values of R' pixels are the values of light rays in the red wavelength range cleared of infrared rays. Therefore, between the matching R' pixels in the image 3 and the image 2, the product of multiplying the value R2$n$ of each R' pixel in the image 2 by a prescribed value K is subtracted from the value R3$n$ of each R' pixel in the image 3. Thus, R4$n$ is figured out from the following equation:

$$R4n = R3n - K*R2n$$

The pixel value of the R' image of the image 3 is replaced by the value of R4$n$. The image thereby generated is an infrared-ray image cleared of the influence of light rays in the red wavelength range. This image will be referred to as an image 4. The prescribed value K is determined on the basis of the ratio between the level of exposure at the time of picking up the image 2 and that at the time of picking up the image 3, though it may as well be the ratio between the time length T2 of exposure at the time of picking up the image 2 and the time length T3 of exposure at the time of picking up the image 3, namely:

$$K = T3/T2$$

Figure 9:
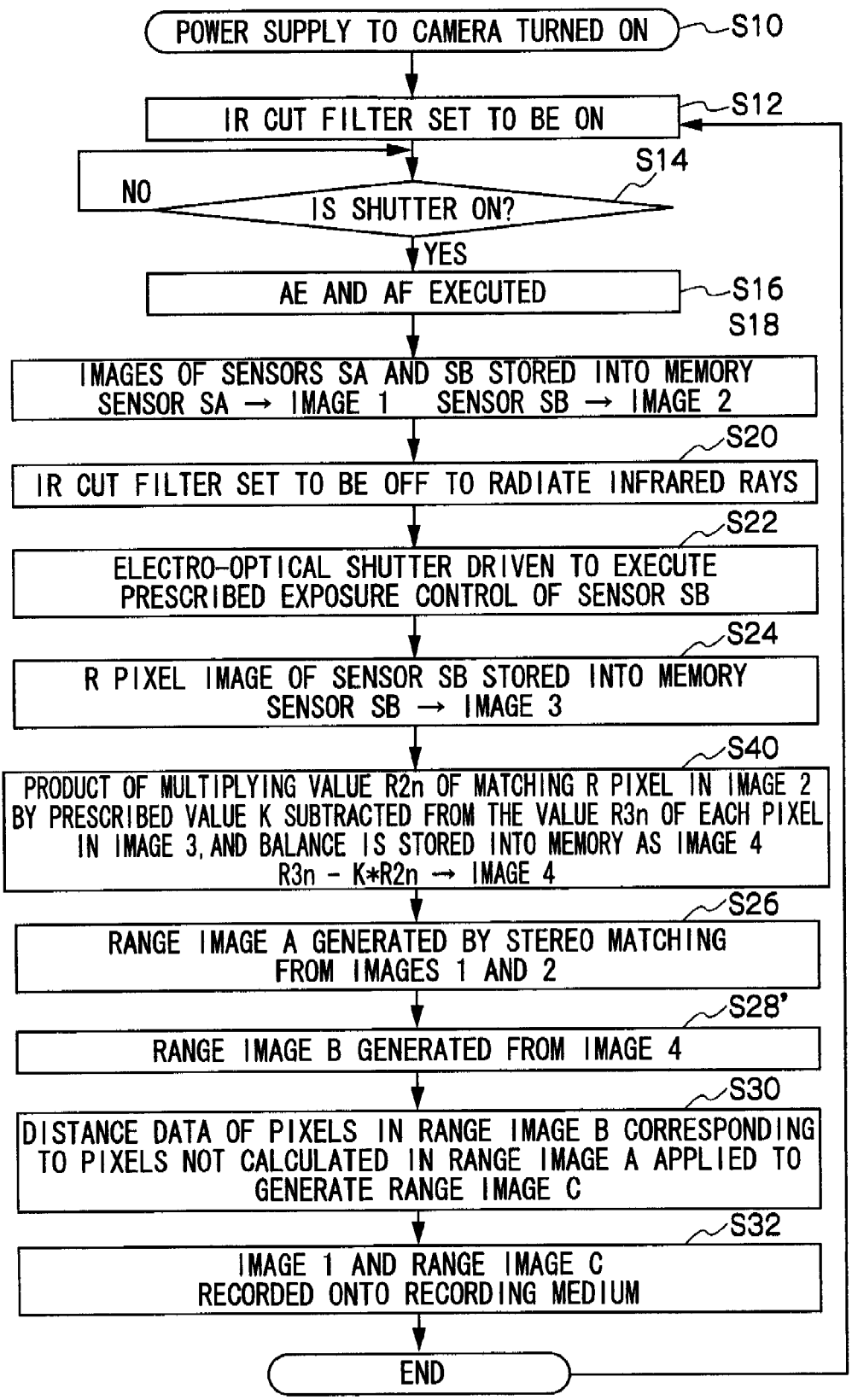
FIG. 9 is a flow chart showing the processing procedure where the accuracy of range calculation in generation of the range image B by the TOF range image generating unit is enhanced in the processing procedure of range image generation shown in the flow chart of FIG. 7.

When the image 4 is generated at step S40 of FIG. 9 as described above, the range image B is generated from the image 4 at step S28' instead of generating the range image B from the image 3. Processing at steps S26, S30 and S32 after step S40 are identical with their respective counterparts in FIG. 7; the range image C is obtained by using the range image B generated from the image 4.

Next, another embodiment regarding the pixel filter of the image sensors SB in the image pickup unit PB will be described. In the foregoing embodiment, the range image B generated from the image 3 captured by the image pickup unit PB derives only from the R' pixels obtained by the light receiving elements of the image sensors SB in which the R' pixel filter is arranged (the R' light receiving elements) shown in FIG. 5. For this reason, the resolution of the range image B is only ¼ of all the pixels. Therefore, as pixel filters for the image sensors SB, ones having the following filtering characteristics are used. This enables the range image B to be generated by using all the pixels of the image obtained by all the light receiving elements of the image sensors SB, and the resolution of the range image B to be thereby enhanced.

Figure 10:
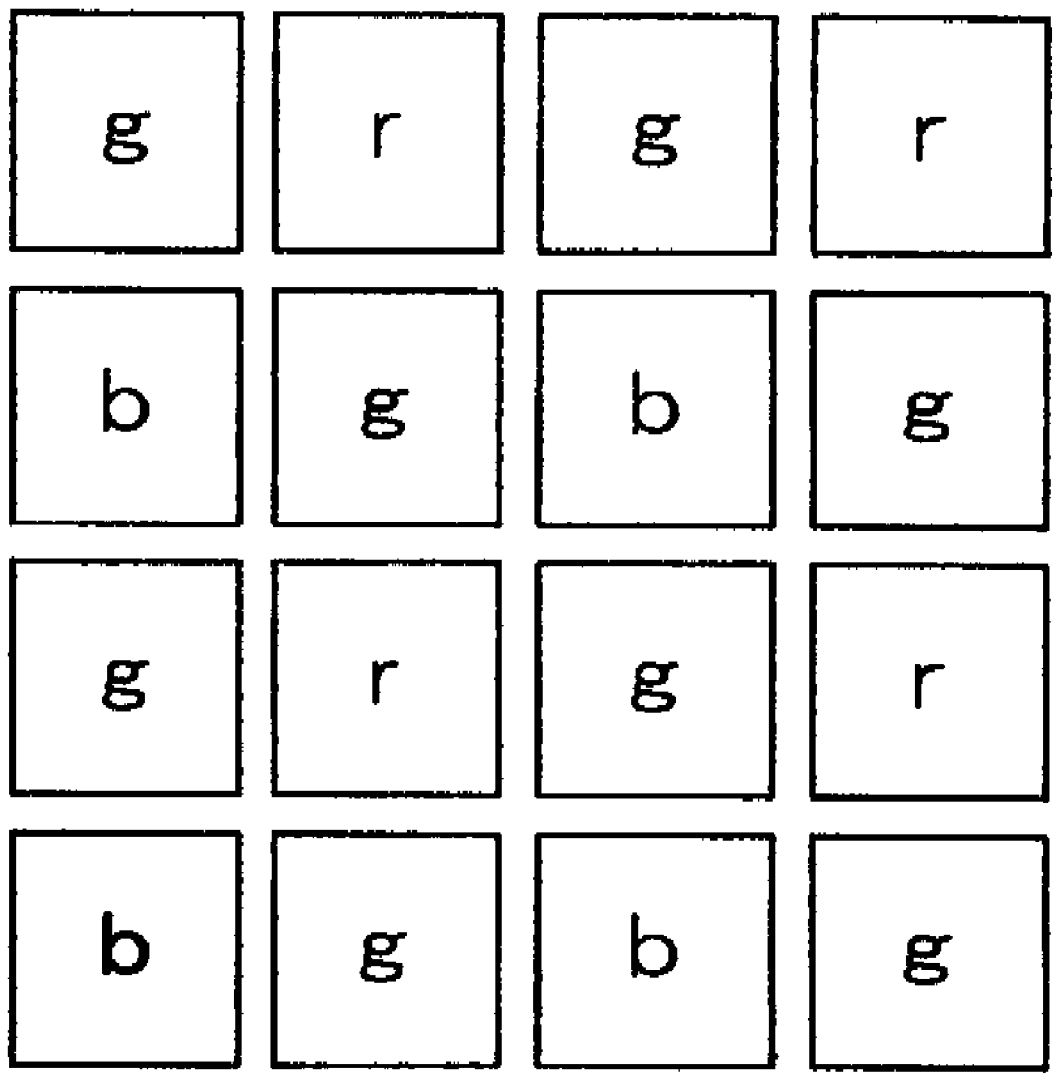
FIG. 10 shows the pixel filter arrangement in the image sensor SB of the image pickup unit PB in another embodiment of the invention.

The pixel filter arrangement of the image sensors SB of the image pickup unit PB in this embodiment is shown in FIG. 10. In this diagram, the pixel filters marked r, g and b are pixel filters which transmit light rays in the red, green and blue wavelength ranges, respectively. Comparing the array of the r, g and b pixel filters with that the R, G and B pixel filters of the image sensors SA shown in FIG. 4, the r pixel filter corresponds to the R pixel filter, the g pixel filter, the G pixel filter and the b pixel filter, the B pixel filter. The array of the r, g and b pixel filters is identical to that of the R, G and B pixel filters.

On the other hand, the filtering characteristics of the r, g and b pixel filters differ from those of the R, G and B pixel filters of the image sensors SA.

Figure 11:
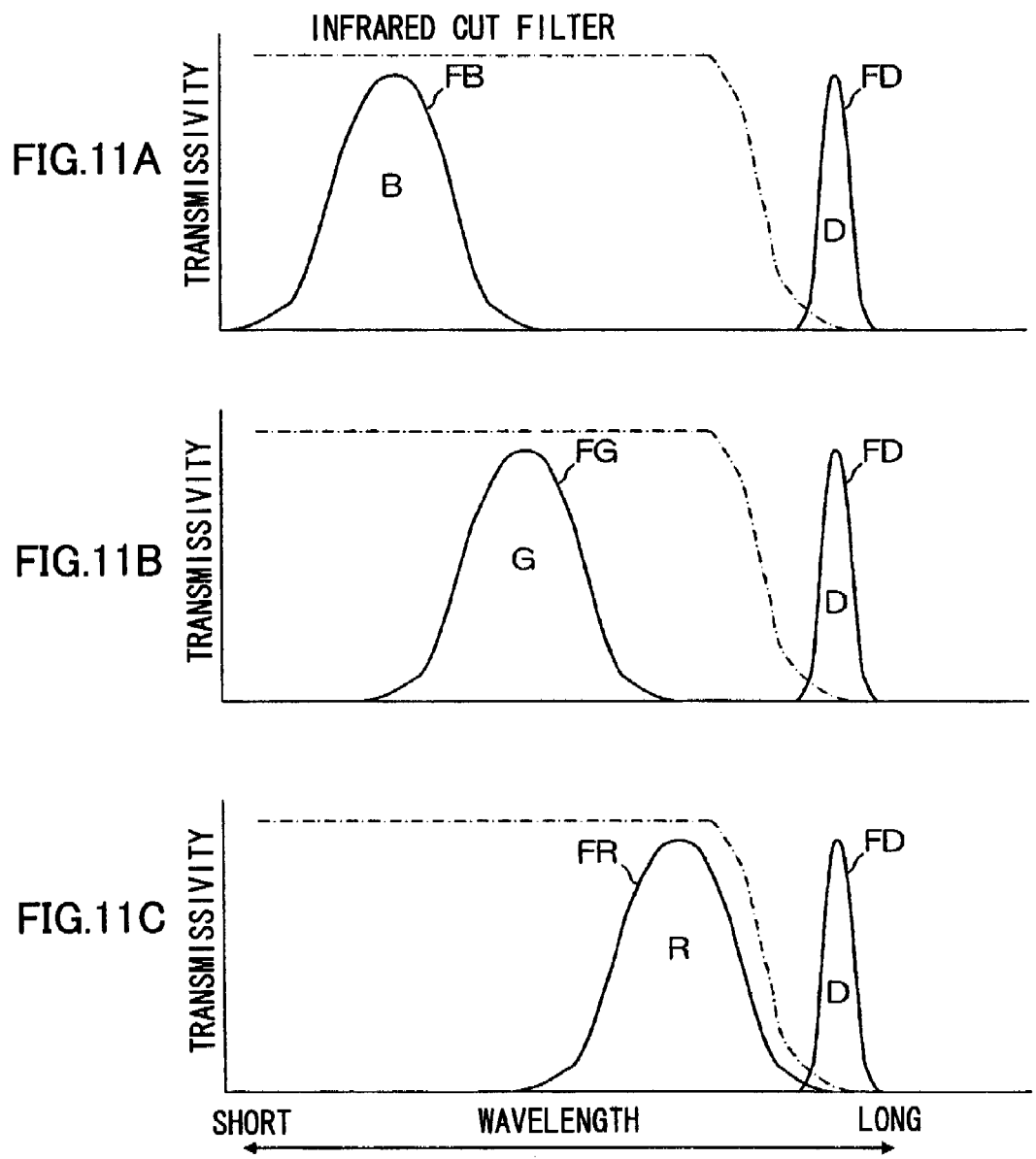
FIGS. 11A to 11C show the wavelength characteristics of the pixel filters shown in FIG. 10.

FIGS. 11A, 11B and 11C show the wavelength characteristics of the b, g and r pixel filters, respectively. As these graphs indicate, the r, g and b pixel filters, like the R, G and B pixel filters of the image sensors SA, have wavelength peaks achieving the respective highest light transmissivity levels at prescribed wavelengths in the red, green and blue wavelength ranges as indicated by the curves FR, FG and FB. On the other hand, the r, g and b pixel filters have wavelength peaks achieving the respective highest light transmissivity levels at prescribed wavelengths in the infrared wavelength range indicated by FD in each graph, and each pixel filter has two wavelength peaks one in red, green and blue wavelength ranges and the other, an infrared wavelength range respectively. As a result, the r, g and b pixel filters have characteristics to transmit infrared rays emitted by the infrared ray radiating units 18 as well.

By arraying such pixel filters in the light receiving elements of the image sensors SB in the arrangement shown in FIG. 10, the following images are obtained by the image pickup unit PB. When images are captured in a state in which the infrared cut filter 62 is inserted into the optical path of the image pickup unit PB, the image pickup unit PB takes on similar characteristics to those of the image pickup unit PA because infrared rays are cut off by the infrared cut filter 62. Therefore, as images of visible light are captured by the image pickup unit PB, these images can be acquired as the images 2 for use in the generation of the range image A by the stereo-matched range image generating unit 70 in the embodiment described above.

On the other hand, when images are captured by irradiating the subject with infrared rays from the infrared ray radiating units 18 in a state in which the infrared cut filter 62 is kept away from the optical path of the image pickup unit PB, infrared rays radiated from the infrared ray radiating units 18 are received by all the light receiving elements in which r, g and b pixel filters are arranged (r, g and b light receiving elements) in the image sensors SB. Therefore, images (r, g and b pixels) obtained by all the light receiving elements in the image sensors SB can be made images 3 to be used for the generation of the range image B by the TOF range image generating unit 72 in the embodiment described above.

As it is made possible in this way to generate the range image B formed of all the pixels of the images obtained from all the light receiving elements in the image sensors SB, the resolution of the range image B can be enhanced.

Figure 12:
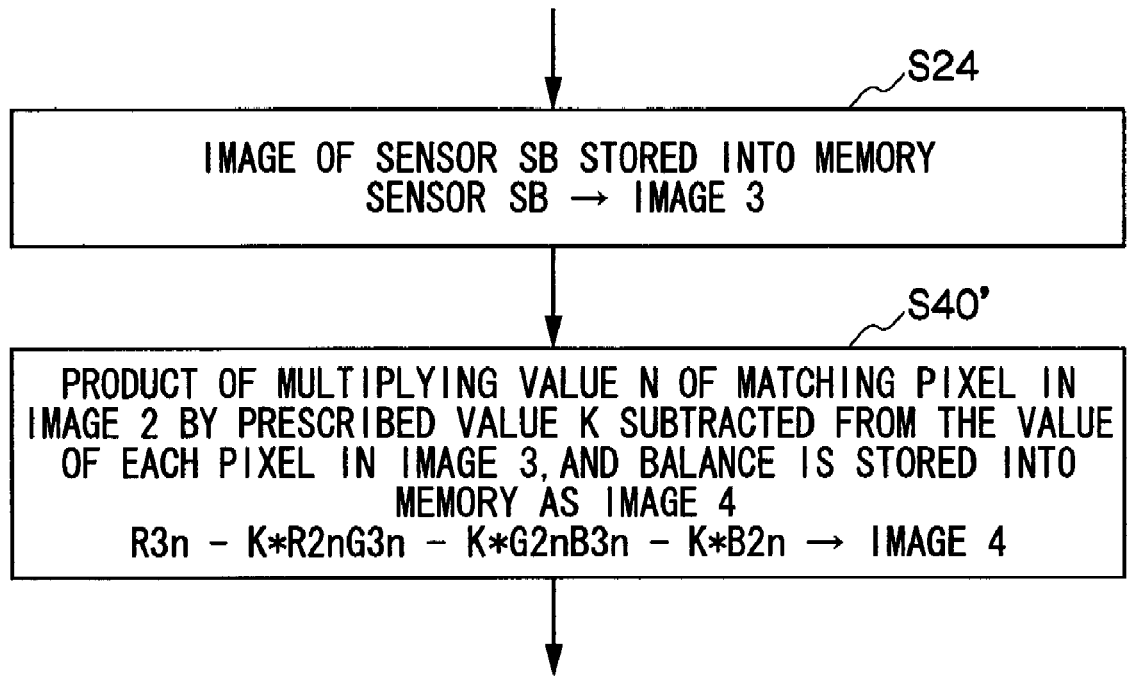
FIG. 12 is a chart used for describing a case in which processing that corresponds to step S40 in FIG. 9 is applied where the image sensor SB in the pixel filter arrangement of FIG. 10 is used.

Incidentally, when the influence of visible light is to be eliminated from the values of pixels in the image 3 as in the processing at step S40 of FIG. 9, the image 4 is obtained by subtracting the product of multiplying the value of each pixel in the image 2 by the prescribed value K from the pixel values with respect to not only r pixels but also g and b pixels as at step S40' in FIG. 12 instead of step S40 in FIG. 9.

In the context of this embodiment, the images to be captured for range image generation by the stereo-matched range image generating unit 70 will be referred to as the first image, the wavelength range of the subject light which forms that image as the first wavelength range, and the pixel filters arranged in the light receiving elements to capture the first image in the image sensors SA and SB of the image pickup units PA and PB as the first pixel filters; the images to be captured for range image generation by the TOF range image generating unit 72 will be referred to as the second image, the wavelength range of the subject light which forms that image as the second wavelength range, and the pixel filters arranged in the light receiving elements to capture the second image in the image sensor SB of the image pickup unit PB as the second pixel filters. Regarding this embodiment, there is cited a case in which the first wavelength range is the visible wavelength range, the first pixel filters are pixel filters which transmit light rays in the red, green and blue wavelength ranges, and the second wavelength range is the infrared wavelength range. On the other hand, regarding the second pixel filters, in the mode of the image sensors SB of FIG. 5, the R' pixel filters which are pixel filters transmitting the red wavelength range, also being the first pixel filters, augmented with a characteristic to transmit rays in the infrared wavelength range are used as the second pixel filters, while in the mode of the image sensors SB shown in FIG. 9 the r, g and b pixel filters made up of all kinds of the first pixel filters (all of the red, green and blue pixel filters) provided with a characteristic to transmit rays of the infrared wavelength range are used as the second pixel filters.

Apart from these embodiments described above, it is also possible to implement the invention in other embodiments. The first wavelength range may as well be an invisible wavelength range or a further limited part of the visible wavelength range. The second wavelength range may be any wavelength range other than the first. For instance, the first wavelength range may be an infrared wavelength range and the second, a visible wavelength range. The first pixel filters, which have a characteristic to transmit light rays of the first wavelength range, may be enabled by the arrangement of a plurality of types of pixel filters differing in transmissible wavelength range as in the above embodiment to transmit light rays of the first wavelength range and by the light receiving elements in which those pixel filters are arranged to capture the first images, or may be pixel filters of a single type that can transmit light rays of the first wavelength range.

On the other hand, for the second pixel filters in the image sensors SB of the image pickup unit PB, where the first pixel filters comprise a plurality of types as in the case stated above, at least one type of the first pixel filters can be provided with a characteristic to transmit light rays of the second wavelength range and thereby being enabled to serve also as the second pixel filters. Where the first pixel filters are of only one type, the first pixel filter can be provided with a characteristic to transmit light rays of the second wavelength range to serve as the second pixel filters.

Further, while the infrared cut filter 62 to cut off infrared rays is inserted into the optical path when the images 1 are to be captured from the image pickup unit PB in this embodiment, if a filter to cut off light rays of the second wavelength range is inserted into the optical path when the first images are to be captured from the image pickup unit PB, pixels constituting the first image can also be appropriately acquired from the light receiving elements in which the first pixel filters, which also serve as the second pixel filters, are arranged. Though not used in this embodiment, a filter to cut off light rays of the first wavelength range may be inserted into the optical path when the second images are to be captured from the image pickup unit PB.

In this embodiment, two first images are captured from the two image pickup units PA and PB to have the stereo-matched range image generating unit 70 generate the range image A and one second image is captured from the image pickup unit PB to have the TOF range image generating unit 72 generate the range image B, the number of image pickup units need not be limited to two, but a greater number of image pickup units may be provided to have these image pickup units capture the first images to have the stereo-matched range image generating unit 70 generate the range image A and at least one of these image pickup units capture the second images to have the TOF range image generating unit 72 generate the range image B.

Figure 13:
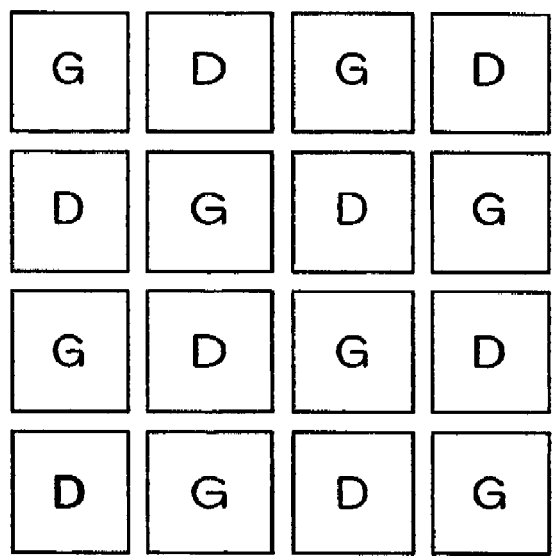
Figure 14:
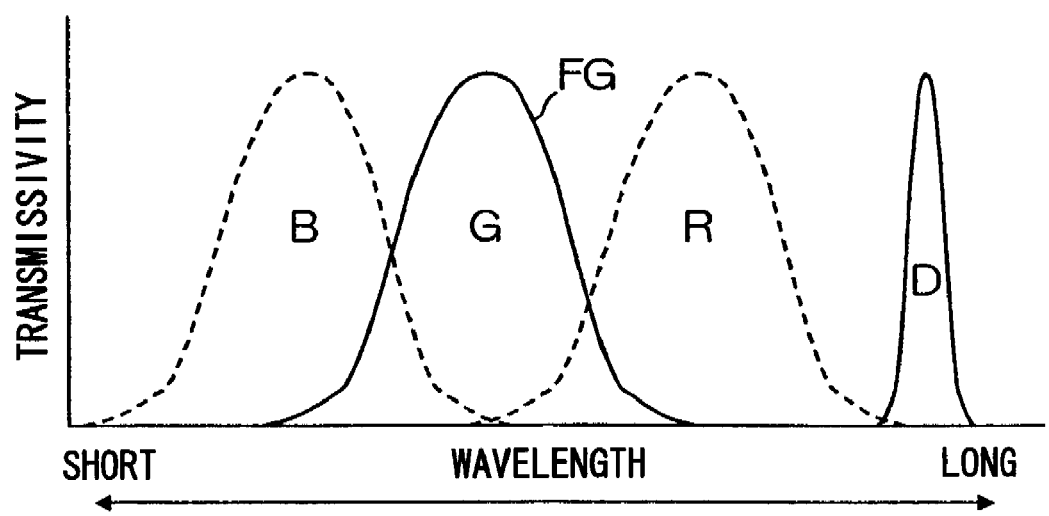
FIG. 14 shows the filtering characteristics of each pixel filter in the image sensor SB.

Next, an embodiment in which the image pickup unit PB is enabled to capture the image 2 and the image 3 without using the infrared cut filter 62. FIG. 13 shows the pixel filter arrangement in the image sensor SB of the image pickup unit PB in this embodiment and FIG. 14, the filtering characteristics of each pixel filter in the image sensor SB. As shown in FIG. 13, the pixel filter arrangement in this embodiment comprises two types of pixel filters, one designated by G and the other by D. The G pixel filters have the same filtering characteristics as the G pixel filters in the image sensors SA of the image pickup unit PA shown in FIG. 4, and the characteristics to transmit light rays in the green wavelength range as indicated by curve FG in FIG. 14. The G pixel filters in the image sensors SB are arranged in light receiving elements in the positions matching the light receiving elements in which the G pixel filters in the image sensors SA of the image pickup unit PA are arranged (the same position in each image sensor).

On the other hand, the D pixel filters in the image sensors SB of the image pickup unit PB, having a characteristic to transmit light rays in the infrared wavelength range, transmit infrared rays emitted from the infrared ray radiating units 18. They are arranged in light receiving elements in the positions matching the light receiving elements in which the R and B pixel filters in the image sensors SA of the image pickup unit PA shown in FIG. 4 are arranged (the same positions).

Where image sensors SB in which such G and D pixel filters are arranged are used, for the images 2 to be captured from the image pickup unit PB for the generation of the range image A by the stereo-matched range image generating unit 70, images made up of G pixels obtained from light receiving elements in which the G pixel filters in the image sensors SA are arranged are used. Since the characteristics of the G light receiving elements in the image sensors SA and SB of both the image pickup unit PA and the image pickup unit PB are the same, distance calculation by the stereo-matched range image generating unit 70 is processed at a high level of accuracy.

Figure 15:
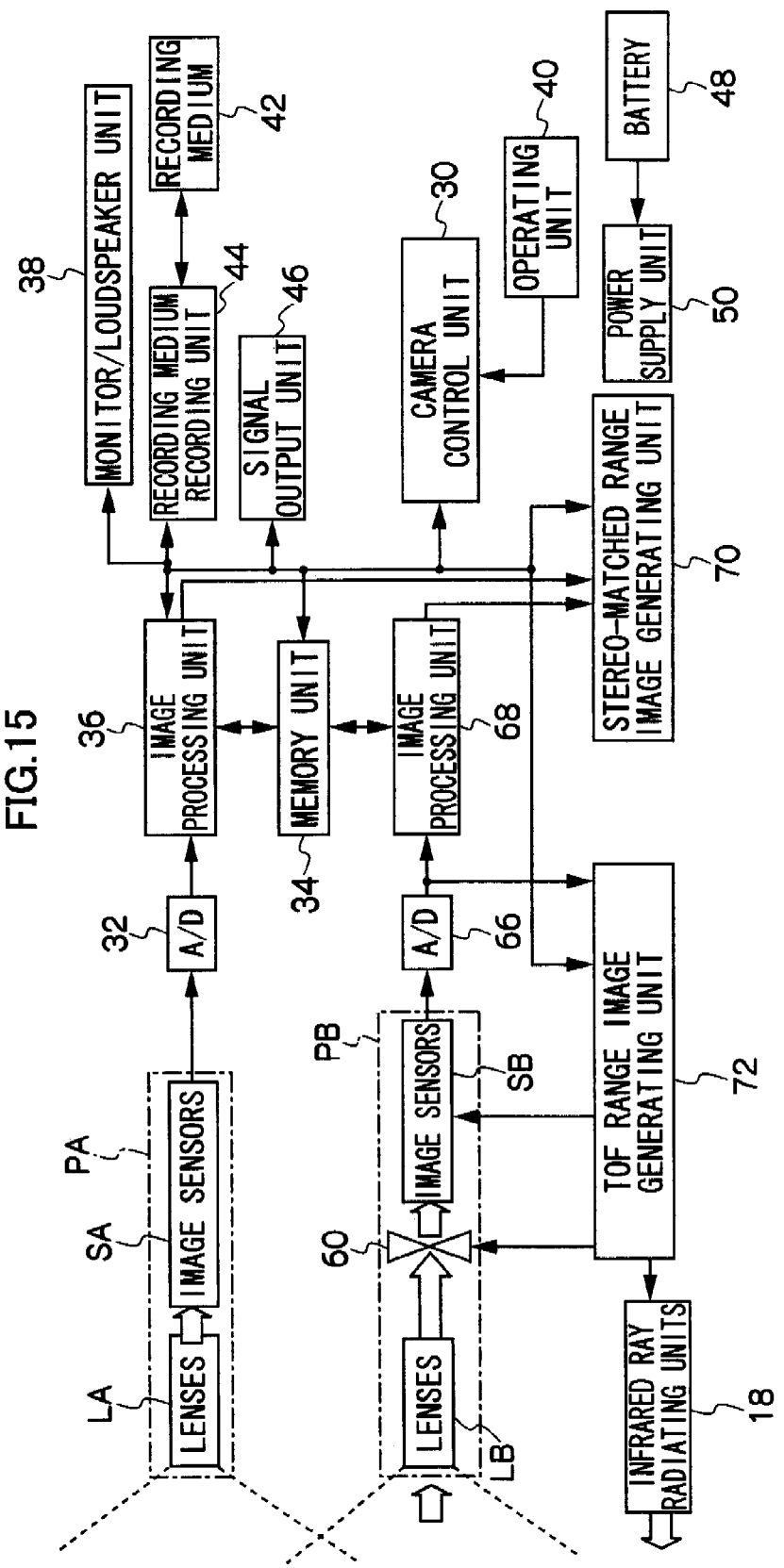

On the other hand, for the images 3 to be captured from the image pickup unit PB for the generation of the range image B by the TOF range image generating unit 72, images made up of D pixels obtained from light receiving elements in which the D pixel filters in the image sensors SB are arranged are used. This enables the image 2 and the image 3 to be captured without having to use the infrared cut filter 62 shown in FIG. 3. The configuration of the camera 10 in this embodiment is shown in FIG. 15. The configuration shown here differs from that shown in FIG. 3 in that the infrared cut filter 62 provided in the image pickup unit PB and the filter driving unit 64 to drive the infrared cut filter 62, both present in FIG. 3, are absent in FIG. 15. The configuration is the same as in FIG. 3 in other respects.

Figure 16:
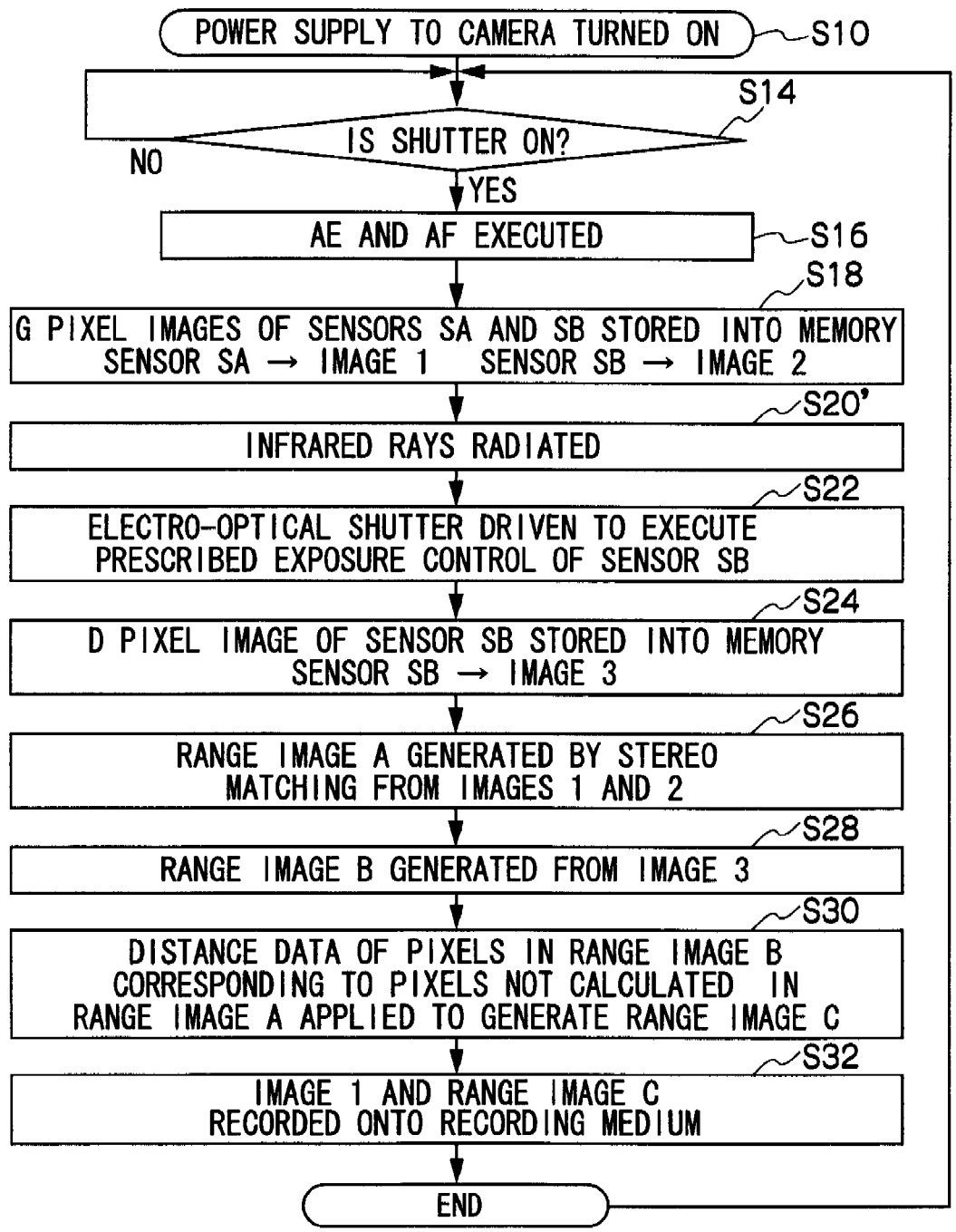

The processing procedure of range image generation in the camera in this embodiment is shown in the flow chart of FIG. 16. In this flow chart, the same processing blocks as in the flow chart of FIG. 7 are assigned respectively the same step numbers as in FIG. 7. The processing procedure in this embodiment shown in the flow chart of FIG. 16 differs from that in the flow chart of FIG. 7 in that the control of the infrared cut filter 62 is unnecessary here. Thus, the actions to control the infrared cut filter 62 at step S12 and step S20 in the flow chart of FIG. 7 are dispensed with. In other respects, basically the same procedure is followed except that images made up of G pixels obtained from light receiving elements in which the G pixel filters are arranged are used as the image 1 and the image 2 to be captured for generation of the range image A by the stereo-matched range image generating unit 70 as at step S18 and that images made up of D pixels obtained from light receiving elements in which the D pixel filters in the image sensor SB are arranged are used as the image 3 to be captured for generation of the range image by the TOF range image generating unit 72 as at step S24.

Next, an embodiment of the invention in which the image 2 for use in generation of the range image A by the stereo-matched range image generating unit 70 and the image 3 for use in generation of the range image B by the TOF range image generating unit 72 are enabled to be acquired by one action of reading from the image sensors SB by using the image sensors SB having the pixel filter arrangement shown in FIG. 13 will be described. In the processing procedure shown in the flow chart of FIG. 16, a time lag is apt to occur for a moving object because the image 2 and the image 3 are captured (read out) from the image sensors SB of the image pickup unit PB with a discrepancy in time. This also tends to invite a drop in frame rate in consecutive shooting, such as shooting of moving pictures.

Figure 17:
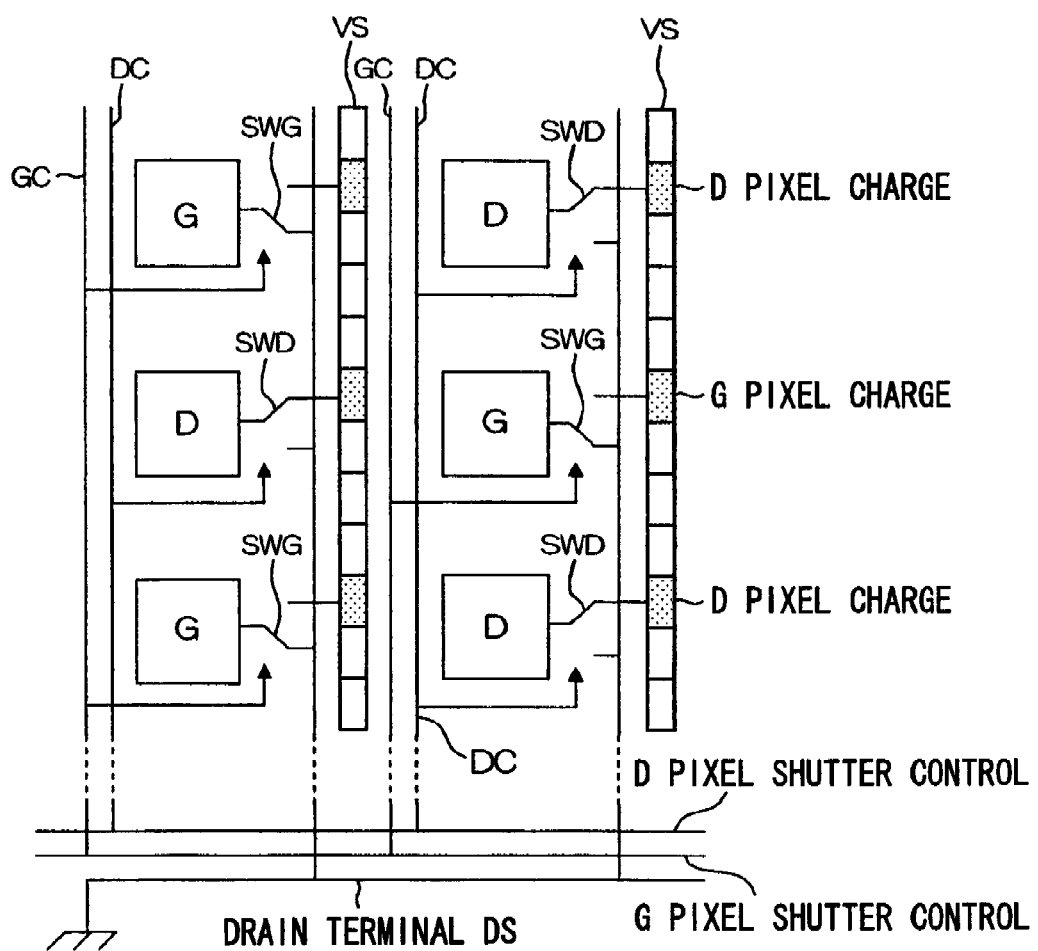
FIG. 17 shows the configuration of the image sensor SB which dispenses with the infrared cut filter of the image pickup unit PB and enables images to be used by the stereo-matched range image generating unit and the TOF range image generating unit to be captured at the same time.

A configuration of the image sensors SB intended, in view of this problem, to enable the image 2 comprising G pixels and the image 3 comprising D pixels can be acquired by only one action to read out of the image sensors SB is shown in FIG. 17. In FIG. 17, light receiving elements indicated by G and D represent light receiving elements in which G pixel filters and D pixel filters are respectively arranged. Each of the light receiving elements is connected switchably by electrical switches SWG and SWD to a vertical transfer path VS on one side and to a drain DS side on the other. The electrical switch SWG of the G light receiving element is connected to a G pixel shutter control line GC while the electrical switch SWD of the D light receiving element is connected to a D pixel shutter control line DC.

The duration of connection of the light receiving element here to the vertical transfer path VS side by the electrical switches SWG and SWD is the period of exposure. The drain DS side has a function to electrically discharge the light receiving elements. Incidentally, MOS switch type or CCD transfer gate type switches can constitute the electrical switches SWG and SWD. Further, the vertical transfer path VS can be read out by matrix wiring as in the case of a CMOS sensor.

By using such image sensors SB, the shutter release timing for the image 2 comprising G pixels picked up by the G light receiving elements and that for the image 3 comprising D pixels picked up by the D light receiving elements can be controlled independently of each other, and the data of both the image 2 and the image 3 can be acquired by a single action to read (transfer) accumulated charges from the image sensors SB, also making possible application to consecutive shooting, such as shooting of moving pictures.

Figure 18:
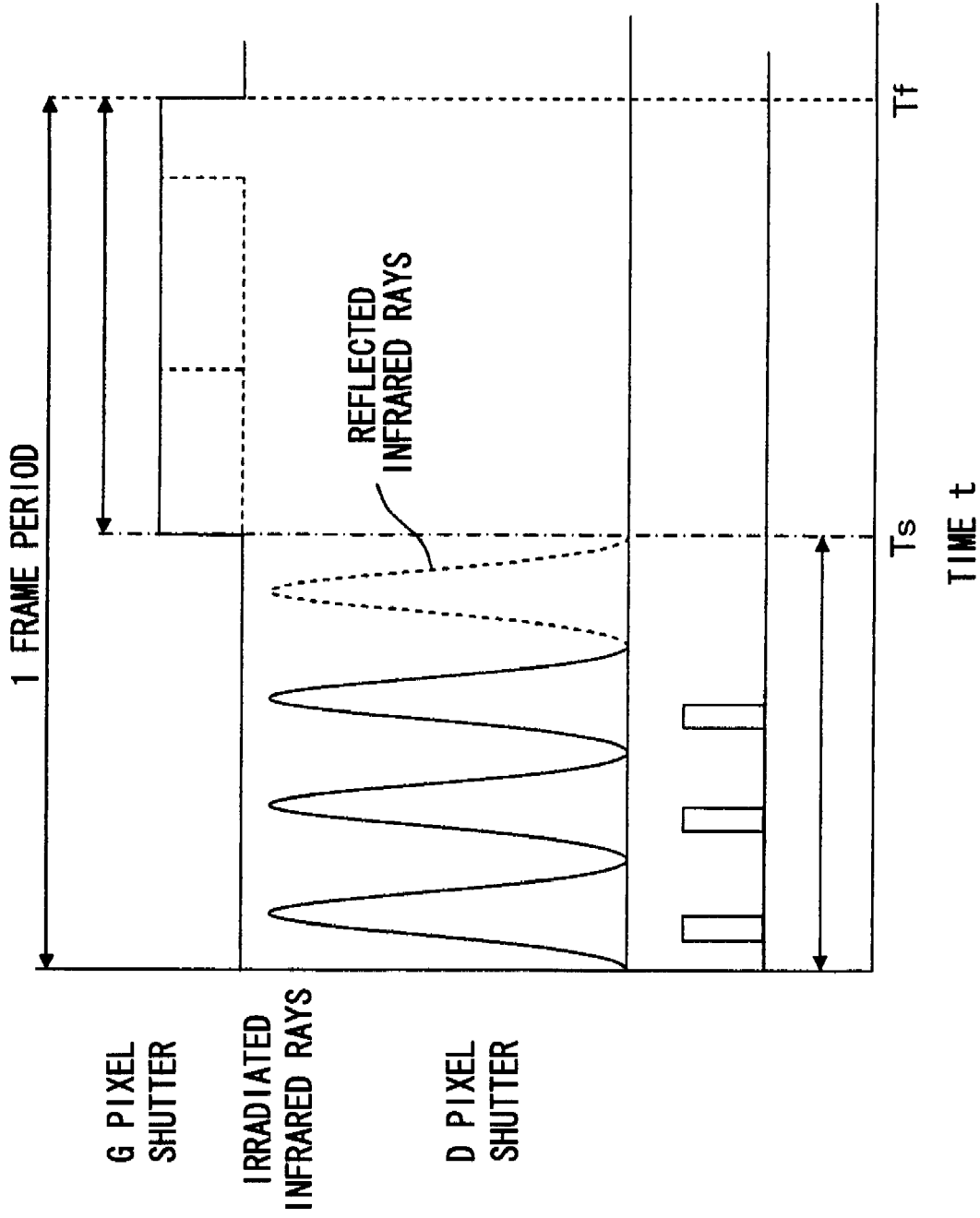
FIG. 18 shows a form of control of the image sensor SB of FIG. 17.

The preferable timing of shutter control to be applied to this control of the image sensors SB is illustrated in FIG. 18. As shown in this graph, a prescribed time TS is set in one frame period, and D pixel shutter control to regulate the electrical switch SWD for the D light receiving elements is performed in the period until TS while G pixel shutter control to regulate the electrical switch SWG for the G light receiving elements is performed in the period from TS until TF.

In the period until TS, pulse-shaped infrared rays of a prescribed time width from the infrared ray radiating units 18 are emitted repeatedly in prescribed periodicity. In the D pixel shutter control during this duration, the electrical switch SWD is changed over in synchronization with the emission of the infrared rays from a state of being connected to the drain DS side (a state represented by the low level) to a state of being connected to the vertical transfer path VS (a state represented by the high level). Upon the lapse of a prescribed length of time, the connection is changed over to the drain DS side. This control is repeated in synchronization with the emission of the infrared rays. Electric charges having undergone photoelectric conversion by the D light receiving elements while the electrical switch SWD is being connected to the vertical transfer path VS, are accumulated in the transfer elements on the vertical transfer path VS.

During the period from TS until TF, on the other hand, the emission of infrared rays by the infrared ray radiating units 18 is suspended. In the G pixel shutter control during this duration, the electrical switch SWG is changed over from a state of being connected to the drain DS side (a state represented by the low level) to a state of being connected to the vertical transfer path VS (a state represented by the high level). Upon the lapse of an appropriate exposure time, the connection is changed over to the drain DS side. Electric charges having undergone photoelectric conversion by the G light receiving elements while the electrical switch SWD is being connected to the vertical transfer path VS, are accumulated in the transfer elements on the vertical transfer path VS.

Upon the lapse of this one frame period, electric charges accumulated in the transfer elements on the vertical transfer path are read out. This enables the data of both the image 2 and the image 3 to be acquired by a single action to read accumulated charges from the image sensors SB. This control makes it possible, by taking into account the delay in the arrival of the reflected light from the subject of infrared rays radiated from the infrared ray radiating units 18 when setting TS, to prevent incidence of unnecessary infrared rays at the time of acquiring the image 2 comprising G pixels. Further, as overlapping of power consumption for picking up the image 2 and the image 3 can be avoided, noise due to any momentary increase in power consumption can be prevented, resulting in a further effect to restraining the infiltration of electrical noise into both images 2 and 3.

In the context of this embodiment dispensing with the infrared cut filter 62, the images to be captured for range image generation by the stereo-matched range image generating unit 70 will be referred to as the first image, the wavelength range of the subject light which forms that image as the first wavelength range, and the pixel filters arranged in the light receiving elements to capture the first image in the image sensors SA and SB of the image pickup units PA and PB as the first pixel filters; the images to be captured for range image generation by the TOF range image generating unit 72 will be referred to as the second image, the wavelength range of the subject light which forms that image as the second wavelength range, and the pixel filters arranged in the light receiving elements to capture the second image in the image sensor SB of the image pickup unit PB as the second pixel filters. Regarding this embodiment, there is cited a case in which the first wavelength range is the green wavelength range, the first pixel filters are pixel filters which transmit light rays in the green wavelength range, and the second wavelength range is the infrared wavelength range, the second pixel filters are pixel filters which transmit light rays in the infrared wavelength range.

Apart from the embodiment described above, it is also possible to implement the invention in another embodiment. The first wavelength range may as well be some other wavelength range than the green, and the second wavelength range may be any wavelength range other than the first. The first pixel filters, which have a characteristic to transmit light rays of the first wavelength range, need not be pixel filters of a single type as in the embodiment described above, but instead may be enabled by the arrangement of a plurality of types of pixel filters differing in transmissible wavelength range to transmit light rays of the first wavelength range and by the light receiving elements in which those pixel filters are arranged to capture the first images, or may be pixel filters of a single type that can transmit light rays of the first wavelength range as in the foregoing embodiment. The second pixel filters in the image sensors SB of the image pickup unit PB, which transmits the light rays of the second wavelength range arranged separately from the first pixel filters, may be arranged in light receiving elements in which the first pixel filters are not arranged. This enables the first image (image 2) and the second image (image 3) to be captured from the image pickup unit PB without having to use any filter which cuts off light rays of the second wavelength range such as the infrared cut filter 62. It is also made possible to pick up the first image and the second image at the time, or to pick them up with a lag between them as in the foregoing embodiment.

In this embodiment, two first images are captured from the two image pickup units PA and PB to have the stereo-matched range image generating unit 70 generate the range image A and one second image is captured from one of the image pickup units, the unit PB, to have the TOF range image generating unit 72 generate the range image B, the number of image pickup units need not be limited to two, but a greater number of image pickup units may be provided to have these image pickup units capture the first images to have the stereo-matched range image generating unit 70 generate the range image A and at least one of these image pickup units capture the second image to have the TOF range image generating unit 72 generate the range image B.

Although a single camera is provided with two image pickup units PA and PB and ordinary recording of an image (image 1) by visible light and generation and recording of range images are made possible in the embodiment described above, the image pickup unit PA and the image pickup unit PB may as well be made separable.

Figure 19:
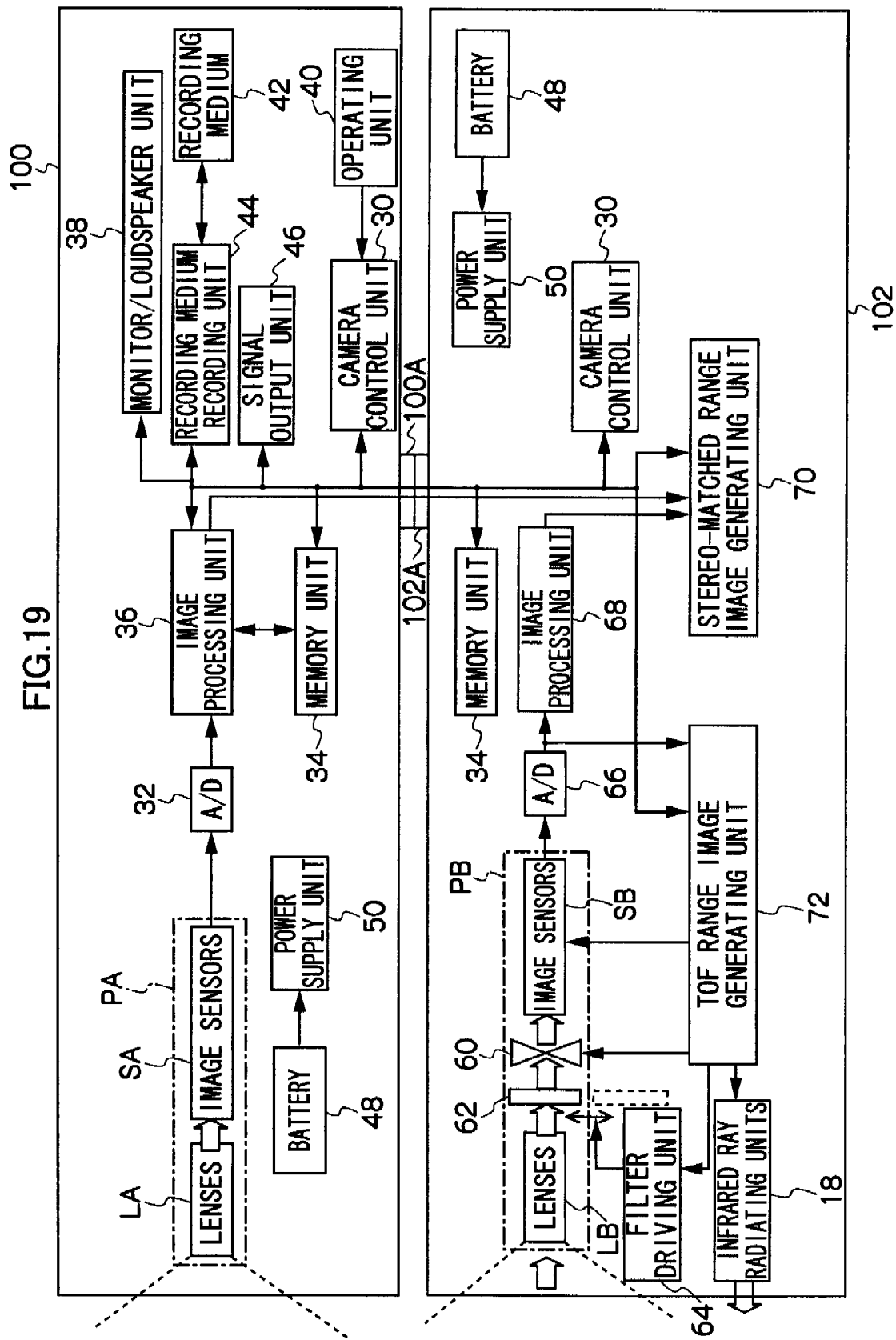
FIG. 19 shows a configuration which enables the two image pickup units PA and PB in the camera of FIG. 1 to be separable.

For instance, the configuration of this embodiment is shown in FIG. 19, wherein the same or similar units as or to their respective counterparts in the camera 10 shown in FIG. 3 are assigned the same reference signs as in FIG. 1. Referring to FIG. 19, a main camera 100 provided with the image pickup unit PA and an auxiliary camera 102 provided with the image pickup unit PB are mechanically and electrically detachable from each other, and the main camera 100 and the auxiliary camera 102 are separable from each other.

The main camera 100 has a function to pick up an image by ordinary visible light with its image pickup unit PA and to record the image onto a recording medium 42. This function enables the main camera 100 to be used as an ordinary camera by itself.

On the other hand, the auxiliary camera 102 is provided with a function regarding range image generation. For instance, it is mounted with units shown in FIG. 3 including the infrared ray radiating units 18, the stereo-matched range image generating unit 70 and the TOF range image generating unit 72. When the auxiliary camera 102 is mechanically fitted to the main camera 100 by way of a prescribed fitting mechanism, for instance an electrical connector 100A of the main camera 100 and an electrical connector 102A of the auxiliary camera 102 are connected to enable signals to be transmitted between the required constituent unit of the main camera 100 and the required constituent unit of the auxiliary camera 102. Incidentally, wireless transmission can be used for signals between the main camera 100 and the auxiliary camera 102.

When the main camera 100 and the auxiliary camera 102 are fitted in this way, similar processing to that by the camera 10 of the configuration shown in FIG. 3 is made possible to enable images by visible light to be recorded and range images to be generated and recorded.

In this embodiment of the invention, the actions and procedure of processing for range image generation in the stereo-matched range image generating unit 70 and the TOF range image generating unit 72 need not be the same as those described with reference to the foregoing embodiments.

Further, though this embodiment has a function to pick up and record not only range images but also ordinary images as a usual camera, its function may as well be limited to the generation of range images.

Now, another embodiment utilizing the configuration of a camera having a range image generating apparatus built into it in the foregoing embodiment will be described.

The main object of this embodiment is to reduce errors in the detection of corresponding points and to shorten the processing time in stereo matching technique by taking note of a prescribed main subject in the angle of image shooting and generating accurate range images of the main subject; furthermore, by enabling range images of only the main subject to be recorded, the quantity of data to be recorded in the recording medium or the like can be reduced and the time taken to transmit data can be shortened.

The configuration of the camera in this embodiment is similar to that of the camera which dispenses with the infrared cut filter 62 of the image pickup unit PB in the foregoing embodiment; its external configuration is identical with what is shown in FIG. 1, its internal configuration, with what is shown in FIG. 15, the pixel filter array in the image sensors SA of the image pickup unit PA, with what is shown in FIG. 4, and that in the image sensors SB of the image pickup unit PB, with what is shown in FIG. 13.

Processing of range image generation in this embodiment will be described with reference to the flow chart of FIG. 20. In this flow chart, the same processing blocks as in the flow chart of FIG. 16 in which the processing procedure of range image generation where the infrared cut filter 62 is dispensed with in the foregoing embodiment is shown are assigned respectively the same step numbers.

In this flow chart, the processing from step S10 through step S24 until the image 1, the image 2 and the image 3 are captured are accomplished in the same way as in the processing shown in the flow chart of FIG. 16.

Upon completion of processing until step S24, the TOF range image generating unit 72 generates the range image B on the basis of the image 3 (step S28). While the stereo-matched range image generating unit 70 generates the range image A at step S26 before step 28 in the flow chart of FIG. 16, it is not accomplished before step S28 in this embodiment.

Next, the TOF range image generating unit 72 divides the distance in the Z axis direction (see FIG. 2) into distance segments each of a prescribed length and, while determining which distance segment the distance data of each pixel in the range image B belongs to, counts the number of pixels (the appearance frequency) determined that each of whose distance data belongs to one or another of the distance segments. Namely, a distance data histogram is drawn (step S60). The distance segment may be the smallest unit of the accuracy of measuring the segment length (1 cm or the like) or a prescribed multiple of the smallest unit (1 cm×5=5 cm or the like). This processing may be performed by the stereo-matched range image generating unit 70 or by some other processing unit.

Figure 21:
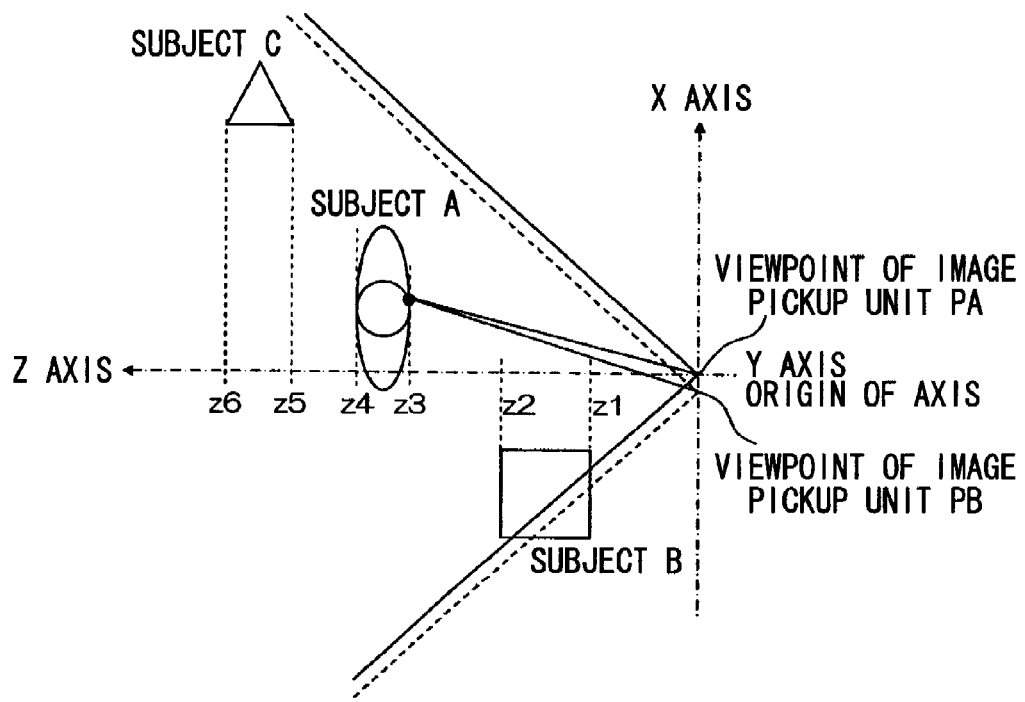
FIG. 21 shows a situation in which three subjects A, B and C are present in the subject field space within the angle of shooting coverage of the camera.
Figure 22:
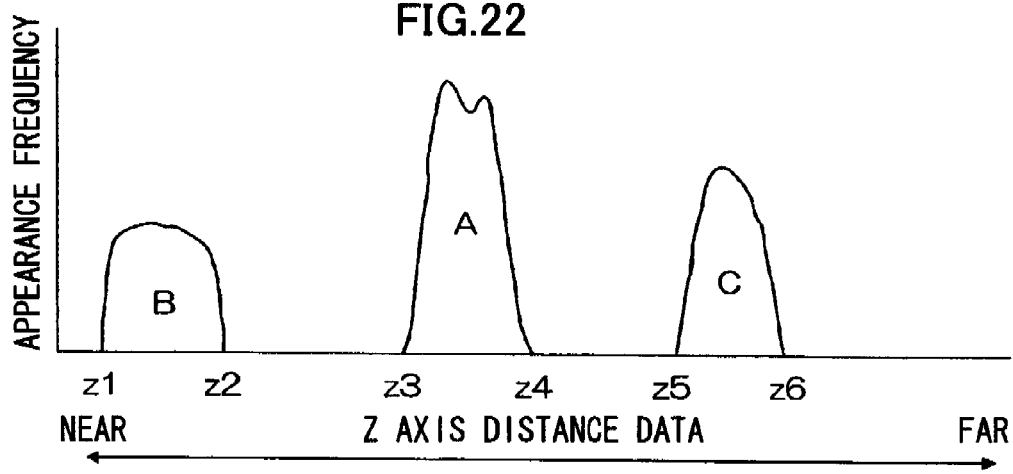
FIG. 22 shows a distance data histogram obtained for the subject field space of FIG. 21.

Supposing here that three subjects A, B and C are present in the subject field space within the angle of image shooting as shown in FIG. 21, a distance data histogram like the one shown in FIG. 22 is drawn from the range image B.

In the distance data histogram of FIG. 22, when the reference point of appearance frequency with respect to the distance represented by the horizontal axis is successively altered from the shorter distance side toward the longer distance side, the subjects A, B and C are present between distances Z1, Z3 and Z5 where the appearance frequency increases from 0 and distances Z2, Z4 and Z6 where the appearance frequency decreases to reach 0. Thus in the distance data histogram it is likely for a subject independent of the peripheral parts to be present between a distance where the appearance frequency increases from 0 and another distance where the appearance frequency decreases to reach 0.

Figure 20:
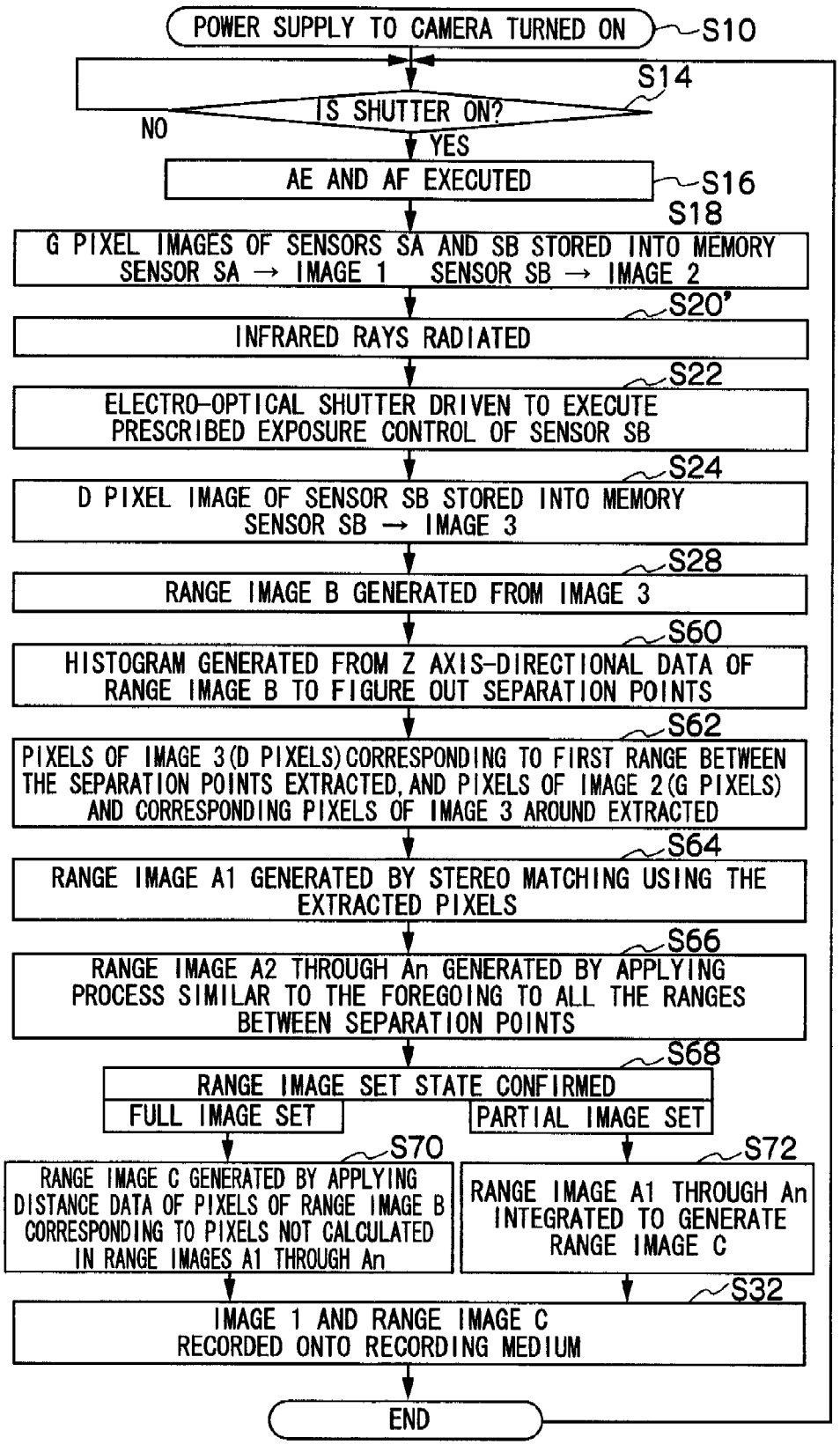
FIG. 20 is a flow chart showing the processing procedure of range image generation by a camera which generates a range image by using a stereo matching technique only for the main subject.

In view of this likelihood, at step S60 of FIG. 20 a distance data histogram is drawn in which subjects present between the distances at which the appearance frequency increases from 0 and the distances at which the appearance frequency decreases to reach 0 are main subjects. First, each distance at which the appearance frequency increases from 0 is detected as the forward separation point and each distance at which the appearance frequency decreases to reach 0 is detected as the backward separation point (step S60 in FIG. 20). This gives a determination that main subjects are present in the distance ranges between forward separation points and backward separation points. In the exemplary case of FIG. 21 and FIG. 22, the distances Z1, Z3 and Z5 are detected as forward separation points and distances Z2, Z4 and Z6 as backward separation points. Further, instead of selecting as separation points the distances at which the appearance frequency increases from 0 and the distances at which the appearance frequency decreases to reach 0 when the reference point of appearance frequency with respect to the distance represented by the horizontal axis is successively altered from the shorter distance side toward the longer distance side, the distance range in which main subjects are likely to be present may as well be detected by using each distance at which the appearance frequency reaches and surpasses a prescribed threshold from a level below the threshold as the forward separation point and each distance at which the appearance frequency drops from the threshold or above it to a level below the threshold as the backward separation point. Further, the distance range in which main subjects are detected, namely the distance range in which the forward separation point and the backward separation point are to be detected may be limited to a certain extent.

When the separation points (the forward separation points and the backward separation points) are detected at step S60, then the distance range between a prescribed one of the forward separation points (e.g. the one at the nearest distance) and the closest one among the backward separation points at a longer distance than that is selected as the first distance range, and pixels having distance data within that first distance range are detected from the range image B. The extent of 3×3 light receiving elements centering on the D light receiving elements of the image sensors SB in positions corresponding to (the same positions as) the detected pixels are made the extent of the objects of distance calculation.

Figure 23:
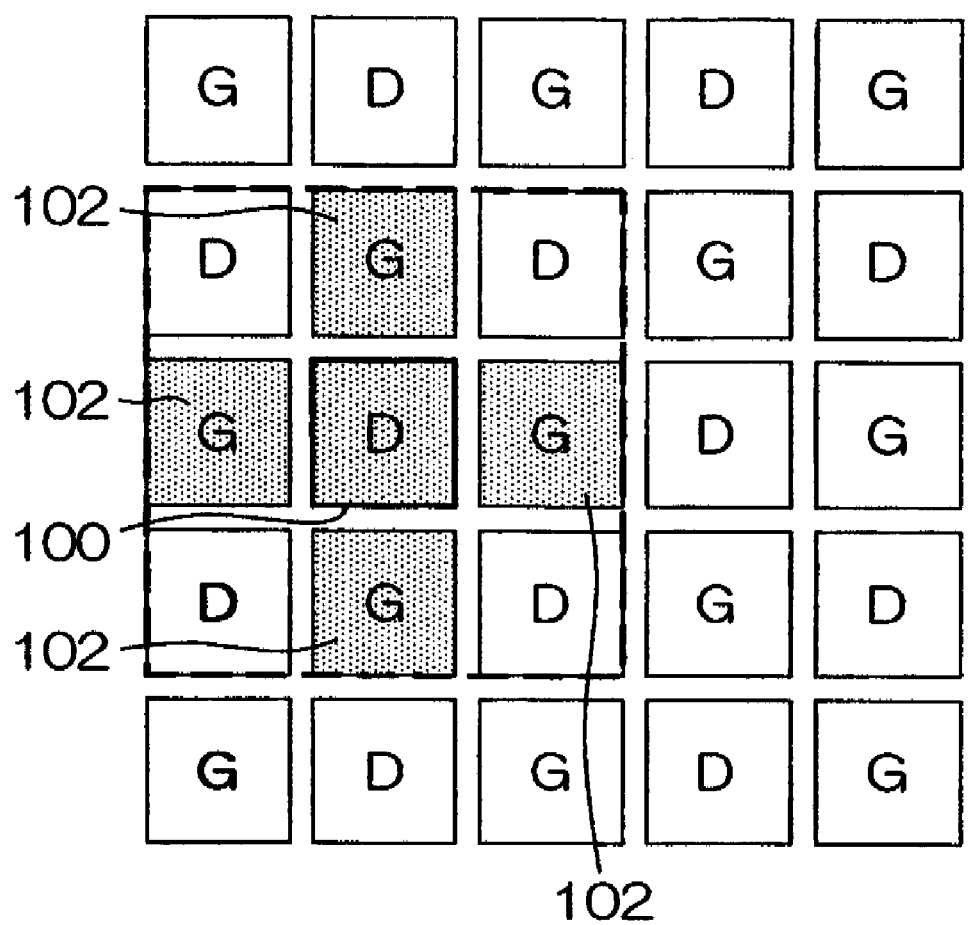
FIG. 23 is a figure used for describing the coverage of range calculation set in the light receiving elements of the image sensor SB.

Thus, among the light receiving elements of the image sensors SB shown in FIG. 23, light receiving element corresponding to a prescribed pixel in the range image B detected as belonging to the distance range of main subjects will be referred to as a light receiving element 100. Then, the extent of light receiving elements, three each in height and abreast, including the G light receiving elements 102, 102, 102 and 102, above, below and to the right and left of the light receiving element 100 is made the extent of the objects of distance calculation. Out of the images obtained from the image sensors SB, pixels obtained by the light receiving elements in the extent of the objects of distance calculation (hereinafter referred to as the pixels in the extent of the objects of distance calculation) are extracted. Pixels for the G light receiving elements in the extent of the objects of distance calculation are extracted from the image 2, and pixels for the D light receiving elements in the extent of the objects of distance calculation are extracted from the image 3 (step S62 in FIG. 20).

After the pixels in an extent of the objects of distance calculation have been extracted, the stereo-matched range image generating unit 70 figures out a range image A1 for the main subject in the first distance range by using the pixels in that extent of the objects of distance calculation and the image 1 by a stereo matching technique (step S64). First, corresponding points between the pixels in the extent of the objects of distance calculation and the image 1 are detected. Incidentally, since the pixels in the extent of the objects of distance calculation are known to be image points for object points belonging to a prescribed distance range (the first distance range), it is possible to limit the pixel extent of the image 1 detected as corresponding points of the pixels within a certain scope and to find the corresponding points at high speed. The corresponding points may as well be detected from the whole image 1, though. Upon detecting the corresponding points, the parallaxes of the corresponding points are figured out as described above to calculate the distance to the object point having each pixel as the image point according to the principle of trigonometry, and the range image A1 the values of whose pixels are the calculated distance data is generated.

The processing performed for the first distance range at step S62 and step S64 is applied to other distance ranges (the second through the n-th distance range) each between a prescribed forward separation point and a prescribed backward separation point, and the range images A2 through An for main subjects in different distance ranges are generated (step S66).

Next, regarding the type of range image to be recorded in the recording medium 42, the user-set state is confirmed (step S68). Types of range image to be recorded include full image and partial image, and the user can set the type of range image to be recorded to the desired one of these options.

In a state in which recording of full images is set, out of the pixels of the image 1 captured by the image pickup unit PA, pixels for which distance data are generated by one of range images A1 through An use the distance data as their values. For other pixels, if interpolation with the distance data of the range image B is possible, those distance data are used as pixel values. In this way, the range image C is generated (step S70). As in the flow chart of FIG. 16, that range image C is recorded onto the recording medium 42 together with the image 1 (step S32).

In a state in which recording of partial images is set at step S68, the range images A1 through An are integrated to generate the range image C. Thus, out of the pixels of the image 1 captured by the image pickup unit PA, pixels for which distance data are generated by one of the range images A1 through An, those distance data are used as pixel values. For other pixels, no distance data are allocated, but a range image comprising only of pixels of which values have been given by the distance data of the range images A1 through An is generated as the range image C (step S72). Then, this range image C is recorded onto the recording medium 42 together with the image 1 (step S32).

Incidentally, the data to be recorded onto the recording medium 42 may be compressed. When range image generation in the camera body takes too long a time, all the images 1, 2 and 3 may be recorded onto the recording medium 42 and range images may be generated as post treatment by the camera body or some other instrument (PC or the like).

Next, the processing procedure to be followed when a threshold (a threshold other than 0) is to be used in detecting the distance ranges (separation points) of main subjects from the distance data histogram will be described with reference to the flow chart of FIG. 24. Incidentally, as the processing at step S10 through step S24 shown in FIG. 20 until the image 1, the image 2 and the image 3 are captured is identical in this embodiment, the processing from step S10 through step S24 is omitted in the flow chart of FIG. 24, and only the processing from step S28 onward shown in FIG. 20 is charted here.

Upon completion of the processing until step S24, then the TOF range image generating unit 72 generates the range image B on the basis of the image 3 (step S28).

Next, the TOF range image generating unit 72 generates a distance data histogram in the same way as in the foregoing embodiment (step S60').

Then, a prescribed threshold L1 is set, the distance at which the appearance frequency rises from below the threshold L1 to or beyond the threshold L1 is selected in the distance data histogram as the forward separation point, the distance at which the appearance frequency falls from the threshold L1 or above to below the threshold L1 is selected as the backward separation point, and the separation points are searched for successively from the shorter distance side toward the longer distance side. The forward separation points and backward separation points detected are designated zu1 through zun and zd1 through zdn, respectively (step 80).

Figure 25:
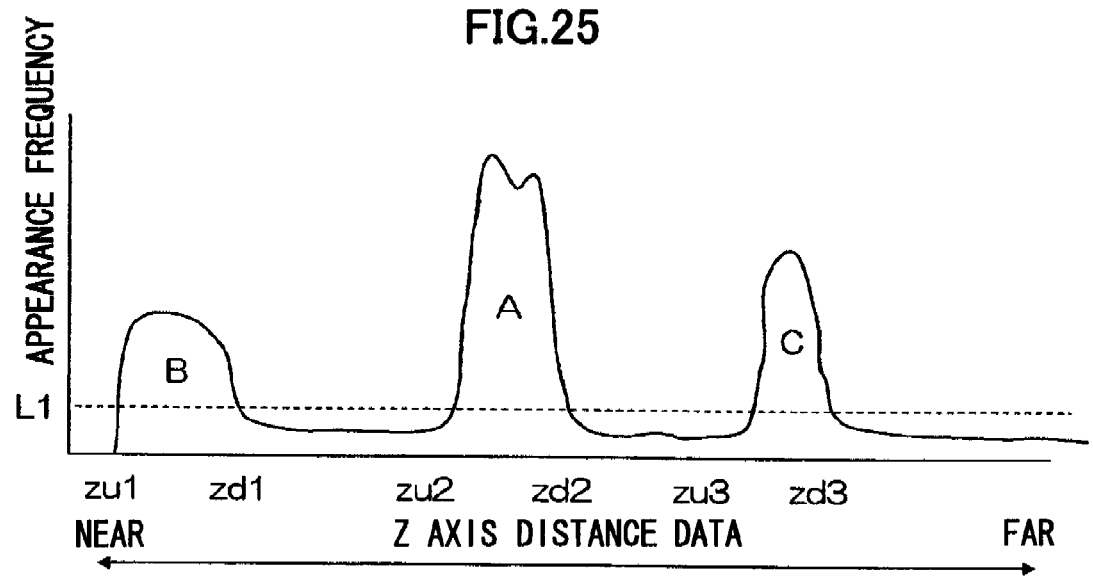
FIG. 25 is a figure used for describing a threshold set for detection of main subjects in the distance data histogram.

It is supposed here that three subjects A, B and C are present in the subject field space within the angle of image shooting as shown in FIG. 21 and that a distance data histogram like the one shown in FIG. 25 is obtained as in FIG. 22. Then setting the threshold L1 and detecting the separation points as in the foregoing case would result in detection of the forward separation points at distances zu1 through zu3 and of the backward separation points at distances zd1 through zd3.

Next, the distance ranges zu1 through zd1, zu2 through zdn, . . . , zd1 through zdn, where main subjects are present, are set from the forward separation point zu1 through zun and the backward separation point zd1 through zdn that have been detected (step S82). Thus, the distance range between one prescribed forward separation point and the nearest of the backward separation points farther than that forward separation point is set as the distance range in which main subjects are present. In the distance data histogram of FIG. 25, each of the distance ranges zu1 through zd1, zu2 through zd2 and zun through zdn is set as a distance range in which main subjects A, B and C are present.

Then, for each distance range in which main subjects are present, pixels having distance data in that distance range are detected from the range image B as in the foregoing embodiment. As in the foregoing embodiment again, pixels in the extent of the objects of distance calculation corresponding to the detected pixels are extracted from the image 2 and the image 3 (step S84).

Next, for each distance range, the range images A1 through An for main subjects in each distance range are generated by a stereo matching technique by using the pixels extracted as being within the extent of the objects of distance calculation and the image 1 (step S86).

Then, for pixels for which distance data are generated according to any one of the range images A1 through An, the distance data are used as their pixel values. For other pixels, if interpolation with the distance data of the range image B is possible, those distance data are used as pixel values. In this way, the range image C is generated (step S88). As at step 32 in the flow chart of FIG. 20, that range image C is recorded onto the recording medium 42 together with the image 1.

Although a case in which only the full image is recorded as the range image C in this flow chart, whichever of the full image or a partial image is to be generated and recorded as the range image C may be left to the user's choice as in the flow chart of FIG. 20.

Next, a method of enhancing the accuracy of distance range detection for main subjects by setting the threshold L1 in the embodiment in the foregoing flow chart of FIG. 24 to an appropriate level will be described.

Figure 26:
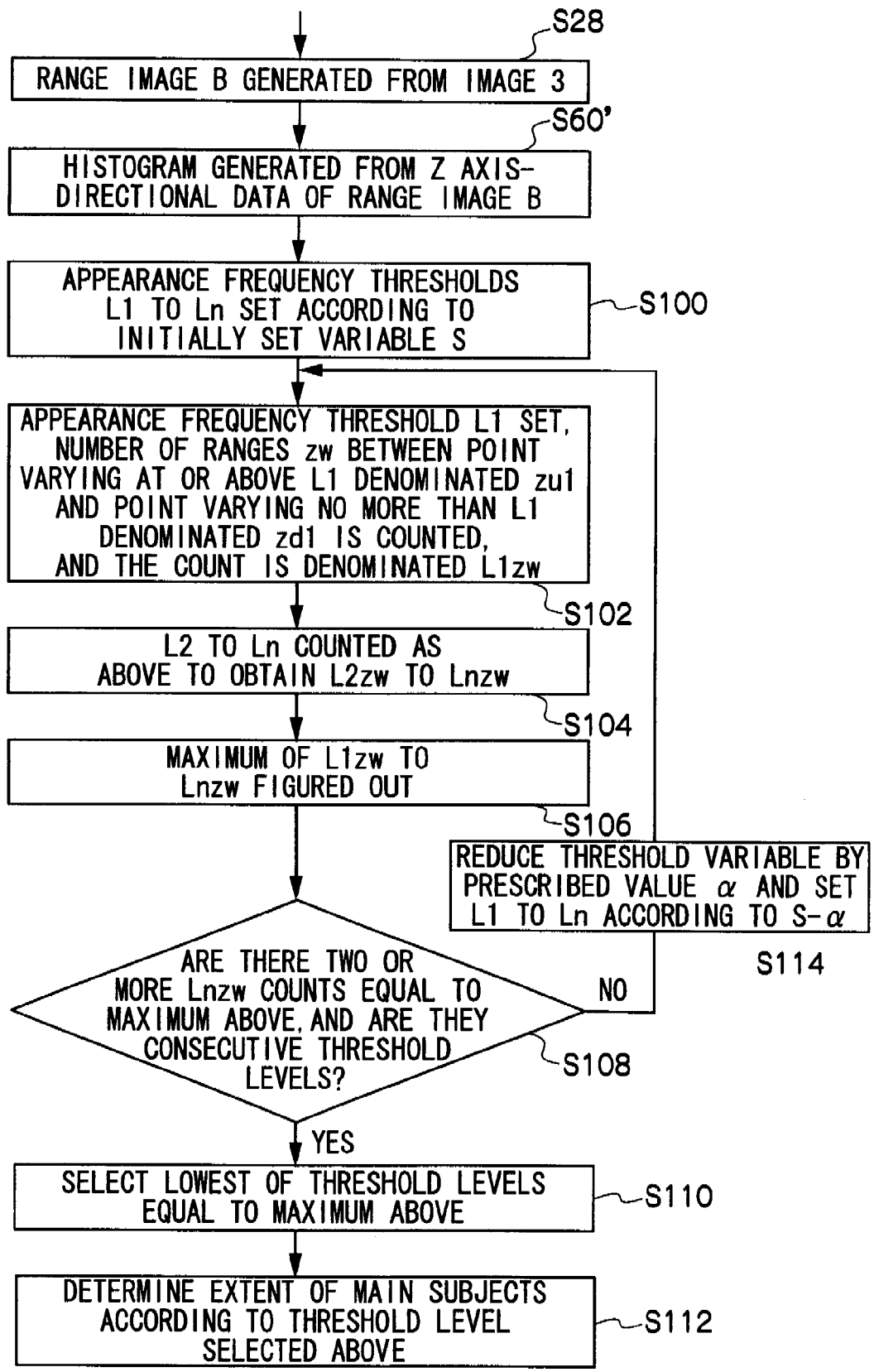
FIG. 26 is a flow chart showing the processing procedure for setting an appropriate threshold in detecting the range extents of main subjects according to the distance data histogram.

FIG. 26 is a flow chart showing the processing procedure for setting an appropriate threshold. Incidentally, as the processing at step S10 through step S24 shown in FIG. 20 until the image 1, the image 2 and the image 3 are captured is identical in this embodiment, the processing from step S10 through step S24 is omitted in the flow chart of FIG. 26, and only the processing from step S28 onward shown in FIG. 20 is charted here.

Upon completion of the processing until step S24, then the TOF range image generating unit 72 generates the range image B on the basis of the image 3 (step S28).

Next, the TOF range image generating unit 72 generates a distance data histogram in the same way as in the foregoing embodiment (step S60').

Then, a plurality of thresholds L1 through Ln for the appearance frequency in the distance data histogram are determined with a prescribed given variable S being supposed (step S100).

Figure 27:
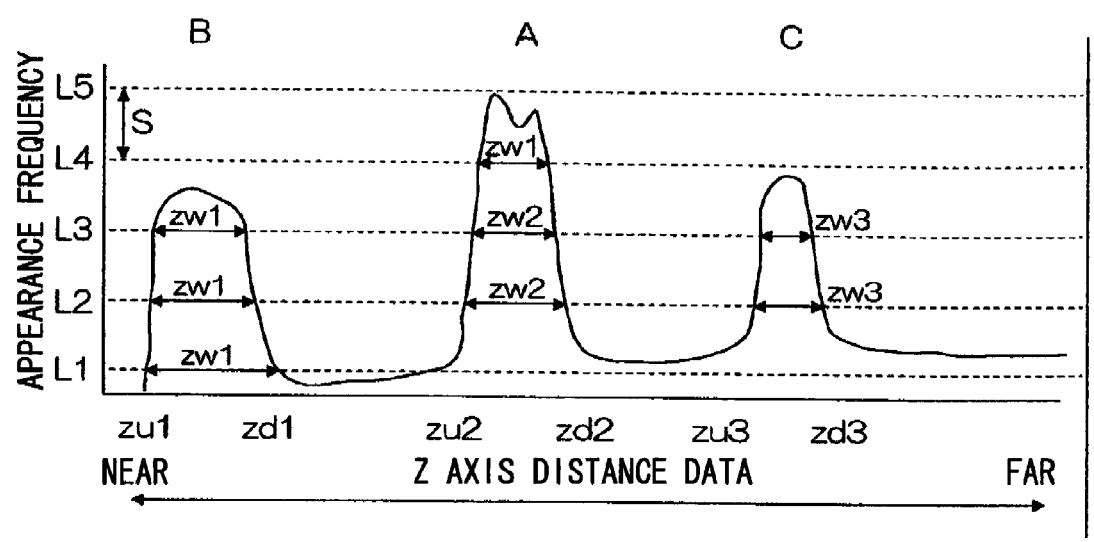
FIG. 27 shows the distance data histogram used for describing the threshold to be set in the processing procedure of FIG. 26.

It is supposed here that three subjects A, B and C are present in the subject field space within the angle of image shooting as shown in FIG. 21 and that a distance data histogram like the one shown in FIG. 27 is obtained as in FIG. 22. Then, values obtained by successively adding a prescribed appearance frequency count (given variable) S to the prescribed minimum threshold L1 are figured out as thresholds L2, L3, . . . Ln. The maximum threshold Ln may be, for instance, the threshold at time of surpassing the maximum appearance frequency in the distance data histogram for the first time. In this way, the thresholds L1 through Ln are determined. In this drawing, as the threshold L5 first surpassed the maximum appearance frequency in the distance data histogram for the first time when n was 5, that threshold L5 is the maximum threshold, and thus the thresholds L1 through L5 are determined.

Upon determination of the thresholds L1 through Ln at step S100, first the threshold L1 is set, the distance at which the appearance frequency rises from below the threshold L1 to or beyond the threshold L1 is selected in the distance data histogram as the forward separation point, the distance at which the appearance frequency falls from the threshold L1 or above to below the threshold L1 is selected as the backward separation point, and the separation points are searched for successively from the shorter distance side toward the longer distance side. The forward separation points and backward separation points detected are designated zu1 through zun and zd1 through zdn, respectively. Incidentally, the distance range in which the separation points are searched for may be limited to a certain extent in which main subjects are likely to exist. Then, the number of distance ranges zw between a prescribed one of the forward separation points and the closest one among the backward separation points at a longer distance than that forward separation point (the number of distance ranges) are counted. The number of distance ranges when the threshold is L1 will be referred to as L1$zw$ (step S102).

In the distance data histogram of FIG. 27, two forward separation points zu1 and zu2 and one backward separation point zd1 are detected, and for the forward separation point zu1, the backward separation point zd1 is present as the backward separation point which has, between itself and the forward separation point zu1, the distance range zw1. For the forward separation point zu2 on the other hand, there is no backward separation point which has, between itself and the forward separation point zu1, the distance range. Therefore, when the threshold is L1, the number of distance ranges L1$zw$ between the forward separation point and the backward separation point is 1.

By the same processing as at step S102, the forward separation point and the backward separation point are detected for each of the other thresholds L2 through Ln, and the numbers of distance ranges L2$zw$, L3$zw$, ..., Ln$zw$ between the forward separation point and the backward separation point are figured out (step S104). In the case shown in the distance data histogram of FIG. 27, when the threshold is L2, the distance ranges between the forward separation point and the backward separation point are zw1, zw2 and zw3, and accordingly the number of distance ranges L2$zw$ is 3. When the threshold is L3, the number of distance ranges L3$zw$ is 3. When the threshold is L4, the number of distance ranges L4$zw$ is 1, and when the threshold is L5, the number of distance ranges L5$zw$ is 0.

Next, the maximum of the numbers of distance ranges L1$zw$ through Ln$zw$ figured out at steps S102 and S104 is figured out (step S106). In the case shown in the distance data histogram of FIG. 27, the maximum is 3.

Then, it is determined whether or not there are two or more values equal to the maximum of the numbers of distance ranges among L1$zw$ through Ln$zw$ and whether or not the thresholds at which they are obtained are consecutive (adjacent) in level (step S108). In the case shown in the distance data histogram of FIG. 27, there are two numbers of distance ranges, L2$zw$ and L3$zw$, equal to the maximum of distance ranges, which is 3, and the thresholds L2 and L3 at which they are obtained are consecutive in level. Therefore, the determination at step S108 is YES.

When YES is given at step S108 in this way, the lowest (smallest) threshold at which the maximum number of distance ranges was obtained is set as the optimal threshold for detecting main subjects (step S110). In the case shown in the distance data histogram of FIG. 27, the threshold L2 is set as the optimal threshold for detecting main subjects.

Figure 24:
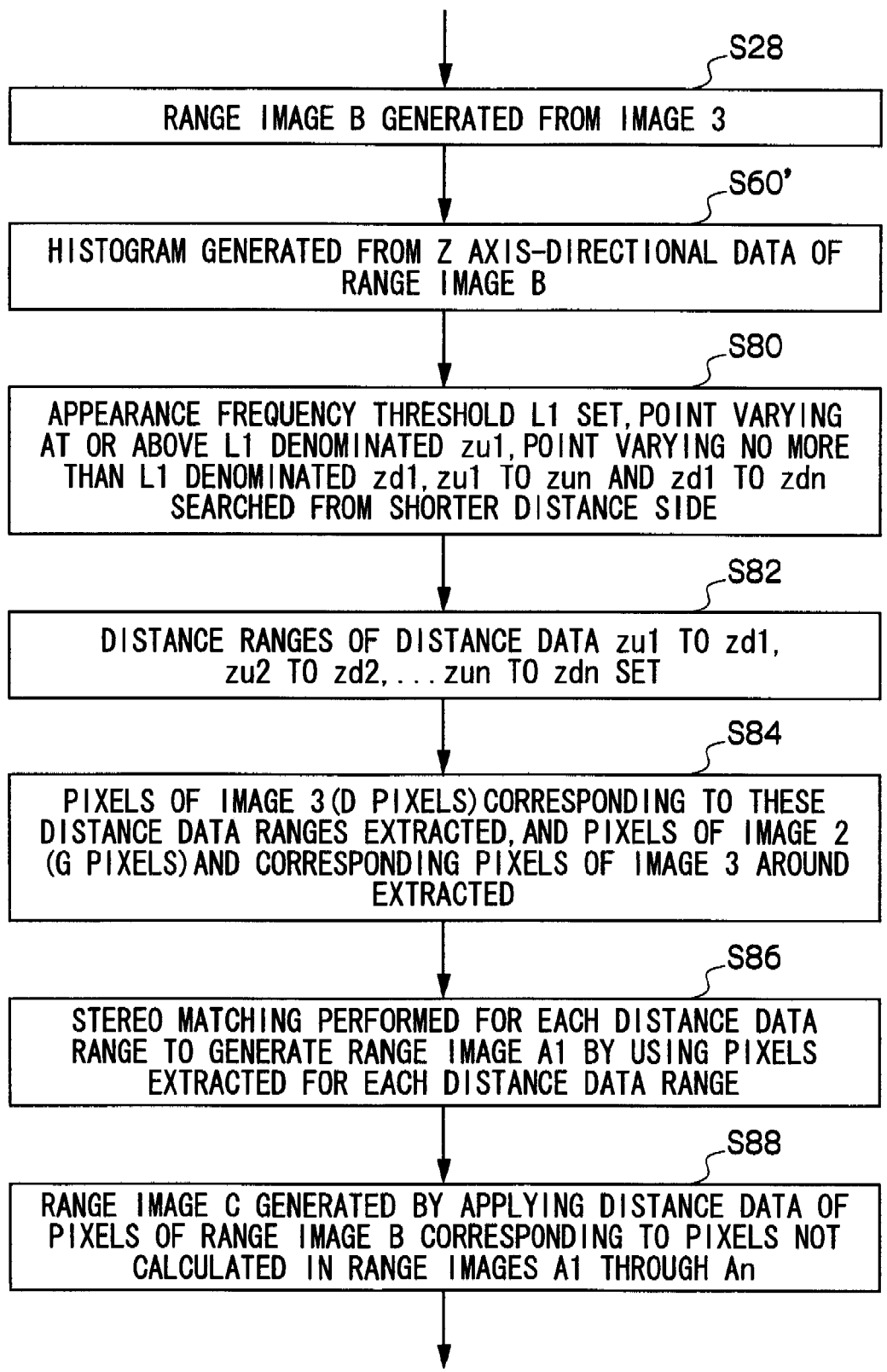
FIG. 24 is a flow chart showing the processing procedure of range image generation when a threshold is used when the range extents (separation points) of main subject are to be detected from the distance data histogram.

Upon setting of the optimal threshold for detecting main subjects, the distance range of main subjects is figured out by using that threshold as at step S80 and step S82 described in the flow chart of FIG. 24 (step S112). The subsequent processing is accomplished in the same way as the processing from step S86 onward described in the flow chart of FIG. 24; the range image C is generated and recorded onto the recording medium 42.

On the other hand, if the determination is NO at step S108, a value S−α resulting from the subtraction of a prescribed quantity α from the given variable S at the time of determining the thresholds L1 through Ln is made the new given variable S, and the thresholds L1 through Ln are determined according to that new given variable S (step S110). Then, until the determination at step S108 turns YES, the processing from step S102 onward is repeated.

Next, another embodiment regarding the detection of the distance range (separation points) of main subjects from the distance data histogram cited above will be described with reference to the flow chart of FIG. 28. Incidentally, as the processing elsewhere than step S80 shown in FIG. 24 is identical here, only step S150, step S152, together replacing step S80, step S28 and step S60', the last two being performed in the same way as in FIG. 24, will be described in FIG. 28.

This embodiment reflects consideration for cases in which main subjects are complexly shaped, and can appropriately detect the distance range of any main subject involving a part which belongs to the same object but is hidden by something else to be invisible, namely any main subject in which occlusion has occurred.

Figure 28:
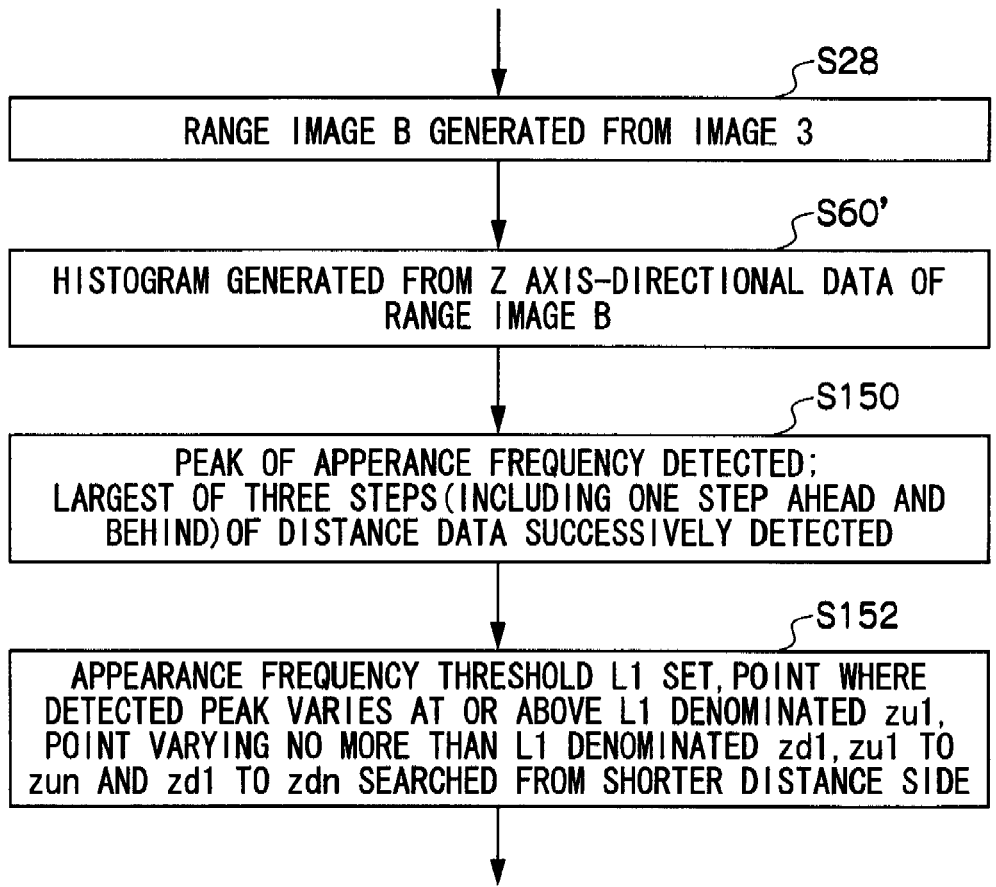
FIG. 28 is a flow chart showing the processing procedure of range image generation in an embodiment of the invention corresponding to a case where main subjects are complexly shaped.

In this embodiment, as in the embodiment shown in the flow chart of FIG. 24, when the image pickup units PA and PB have completed capturing of the image 1, the image 2 and the image 3, the range image B is generated from the image 3 (step S28), and a distance data histogram is generated according to the range image B (step S60'), a peak in the distance data histogram is detected as indicated at step S100 in the flow chart of FIG. 28. This peak detection is filtering having as the appearance frequency of the noted distance what constitutes the maximum (the detected peak value) among the appearance frequencies for a distance equivalent to three steps including one-step equivalent each before and behind the noted distance.

Figure 29:
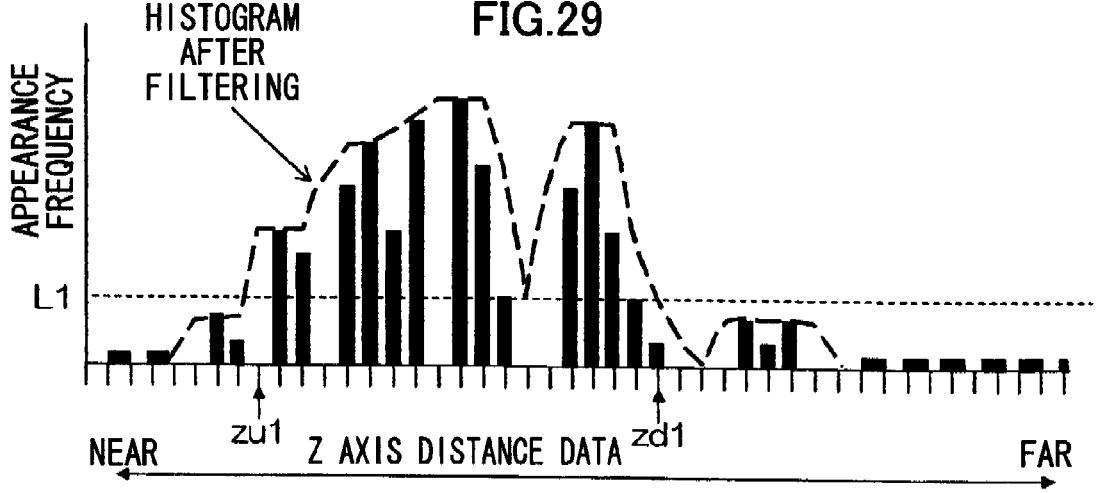
FIG. 29 shows a distance data histogram having undergone filtering.

FIG. 29 shows a distance data histogram of a case in which occlusion has occurred. As shown in this histogram, a part where the appearance frequency is 0 occurs at a specific distance. Therefore, the continuity of subjects is maintained by filtering the distance data histogram. Thus, the peak of the appearance frequency in three distances equivalent to three steps, of which one step is a prescribed distance, is detected from distances on the horizontal axis, and that peak value (detected peak value) is used as the value of the appearance frequency for the central distance of three steps of distance. This results in conversion of the distance data histogram into a curve graph indicated by the broken lines in FIG. 29.

Next at step S152, a prescribed threshold L1 is set for the distance data histogram, and search is done from the shorter distance side toward the longer distance side with the distance in which the peak value detected at step S150 varies from below the threshold L1 to or beyond the threshold L1 is supposed to be the forward separation points and the distance in which the peak value varies from the threshold L1 or above to below the threshold L1, to be the backward separation points. This results in detection of the distance ranges of the main subjects. The detected forward separation points are represented by zu1 through zun, and the backward separation points, by zd1 through zdn (step S152). The subsequent processing is accomplished in the same way as the processing from step S82 onward described in the flow chart of FIG. 24.

Incidentally, filtering at step S150 is not limited to the manner described above, but any filtering to achieve smoothing, such as a moving average process, would be acceptable. The accuracy of filtering can be enhanced by appropriately varying the step intervals of filtering.

To the embodiments shown in FIG. 20 and subsequent drawings, various contents of the previously described embodiments regarding the capturing of the images 1, 2 and 3 and the generation of the range images A and B can be similarly applied.

In every embodiment, data recorded in the recording medium 42, such as the range image C, may be delivered to an external instrument while recording them in the recording medium 42 or without recording them in the recording medium 42. The original images (the images 1 through 3) or intermediate images obtained by prescribed processing for generating the range image C onto the recording medium 42 or an external instrument can be recorded in the recording medium 42 or delivered to an external instrument, and the range image C may be generated as post treatment by the camera body or some external instrument.

What is claimed is:

1. A range image generating apparatus comprising:
a plurality of image pickup units having an optical system which forms images of subjects and image sensors which capture the images of the subjects formed by the optical system with two-dimensionally arrayed light receiving elements as electric signals;
a first image capturing device which captures from each of the plurality of image pickup units an image of the subject formed by light in a first wavelength range as a first image;
a second image capturing device which captures from at least one of the plurality of image pickup units an image of the subject formed by light in a second wavelength range as a second image;
a first range image generating device which generates a first range image having values of pixels as distance data indicating a distance on the basis of a plurality of first images captured by the first image capturing device;
a second range image generating device which generates a second range image having values of pixels as distance data indicating a distance on the basis of a second image captured by the second image capturing device;
a third range image generating device which generates a third range image on the basis of the first range image and the second range image; and
a recording device which records the third range image onto a recording medium,
further comprising a light radiating device which irradiates the subject with light in the second wavelength range, wherein
the second image capturing device irradiates the subject with light in the second wavelength range by using the light radiating device and captures an image of the subject formed by the reflected light thereof as the second image,
wherein the first range image generating device is a range image generating device using a stereo matching technique which detects, from the plurality of first images, corresponding points indicating image points for the same object point, figures out the distance to the object point on the basis of the parallax of the corresponding points, and generates the first range image by using distance data indicating the distance as values of the pixels of the corresponding points,
wherein the second range image generating device is a range image generating device using a TOF technique which figures out the distance to the object point having each pixel as the image point on the basis of the second image representing pixel values according to the length of time taken by the light of the second wavelength range to irradiate the subject and reach the image pickup units, and generates the second range image by using the distance data indicating the distance as the value of each pixel,
wherein the third range image generating device generates the third range image by interpolating the first range image with the second range image,
wherein the third range image generating device applies distance data obtained from pixels corresponding to the second range image to distance data for pixels whose distance could not be calculated in the generating of the first range image.

2. The range image generating apparatus according to claim 1, wherein the third range image generating device generates the third range image by interpolating the distance data of pixels around the corresponding points detected for the first range image by the first range image generating device with the second range image.

3. The range image generating apparatus according to claim 1, wherein the first wavelength range is a visible wavelength range and the second wavelength range is a wavelength range including invisible light.

4. The range image generating apparatus according to claim 1, wherein the second wavelength range is an infrared wavelength range.

5. The range image generating apparatus according to claim 1, wherein the recording device records the first image captured from one image pickup unit out of the plurality of image pickup units onto the recording medium together with the third range image.

6. The range image generating apparatus according to claim 5, wherein a first camera unit having an image pickup unit into which first images to be recorded onto the recording medium are captured and a second camera unit having other image pickup units than this image pickup unit are made separable.

7. The range image generating apparatus according to claim 1,
wherein in the image pickup unit which captures the first images with the first image capturing device, first pixel filters of a single type which transmit light of the first wavelength range or first pixel filters comprising a plurality of types which transmit a light in each of a plurality of wavelength ranges into which the first wavelength range is divided are arranged in the light receiving elements of the image sensors, and the first image capturing device captures the first images with the light receiving elements in which the first pixel filters are arranged, and
wherein in the image pickup unit which captures the second images with the second image capturing device, second pixel filters which transmit light of the second wavelength range are arranged in the light receiving elements of the image sensors, and the second image capturing device captures the second images with the light receiving elements in which the second pixel filters are arranged.

8. The range image generating apparatus according to claim 7, wherein
in the image pickup unit which captures the second images with the second image capturing device, a second wavelength range cut filter which cuts off light in the second wavelength range is detachably arranged on an optical path where light coming incident on the image sensors passes,
the first image capturing device captures the first images in a state in which the second wavelength range cut filter is inserted into the optical path, and
the second image capturing device captures the second images in a state in which the second wavelength range cut filter is kept away from the optical path.

9. The range image generating apparatus according to claim 7, wherein in the image pickup unit which captures the second images with the second image capturing device, the second pixel filters arranged in the light receiving elements of the image sensors are first pixel filters of a prescribed type having filtering characteristics to transmit light of the second wavelength range.

10. The range image generating apparatus according to claim 9, further comprising a second image correcting device which corrects the second images by subtracting, from the values of the pixels of the second images captured by the second image capturing device, values according to the values of corresponding pixels of the first images captured by the first image capturing device from the same image pickup unit as the captured second images.

11. The range image generating apparatus according to claim 10, wherein the second image correcting device corrects the second images by subtracting the product of multiplying the value of the corresponding pixel in the first images by a prescribed value from the value of each pixel in the second images.

12. The range image generating apparatus according to claim 11, wherein the prescribed value is set according to the ratio of the level of exposure at the time of picking up the second images and the level of exposure at the time of picking up the first images.

13. The range image generating apparatus according to claim 9, wherein
the first wavelength range is a visible wavelength range, and
the first pixel filters comprise pixel filters transmitting light of the red wavelength range, pixel filters transmitting light of the green wavelength range and pixel filters transmitting light of the blue wavelength range.

14. The range image generating apparatus according to claim 9, wherein the prescribed type of first pixel filters having filtering characteristics to transmit light of the second wavelength range are pixel filters which transmit light of the red wavelength range.

15. The range image generating apparatus according to claim 9, wherein the prescribed type of first pixel filters having filtering characteristics to transmit light of the second wavelength range are all the types of first pixel filters.

16. The range image generating apparatus according to claim 7, wherein in the image pickup unit into which the second images are captured by the second image capturing device, the second pixel filters are pixel filters arranged in different light receiving elements from the light receiving elements in which the first pixel filters are arranged.

17. The range image generating apparatus according to claim 16, wherein the first wavelength range is the green wavelength range and the first pixel filters are pixel filters which transmit light in the green wavelength range.

18. The range image generating apparatus according to claim 16, wherein the second wavelength range is the infrared wavelength range and the second pixel filters are pixel filters which transmit light in the infrared wavelength range.

19. The range image generating apparatus according to claim 16, wherein in the image pickup unit into which the second images are captured by the second image capturing device, the first pixel filters and the second pixel filters are arranged alternately.

20. The range image generating apparatus according to claim 16, wherein in the image pickup unit into which the second images are captured by the second image capturing device, the image sensors are so configured that each of the light receiving elements is connected changeably between the electric charge discharging side and the electric charge transferring side via electrical switches.

21. The range image generating apparatus according to claim 20, wherein the electrical switches are independently controlled by the light receiving elements in which the first pixel filters are arranged and the light receiving elements in which the second pixel filters are arranged.

22. The range image generating apparatus according to claim 16, wherein the image pickup unit into which the second images are captured by the second image capturing device is so configured as to prevent the light receiving elements in which the first pixel filters are arranged and the light receiving elements in which the second pixel filters are arranged from overlapping each other in the period of exposure.

23. The range image generating apparatus according to claim 22, further comprising a light radiating device which irradiates the subject with light in the second wavelength range, wherein
the subject is irradiated by the light radiating device with light in the second wavelength range during the exposure period of the light receiving elements in which the second pixel filters are arranged, and
the irradiation with light by the light radiating device is suspended during the exposure period of the light receiving elements in which the first pixel filters are arranged.

24. The range image generating apparatus according to claim 23, wherein exposure of the light receiving elements in which the first pixel filters are arranged is not executed in the period in which the light radiating device is radiating light and in the period over which the reflected light of the light from the light radiating device arrives.

25. A method of generating range images comprising:
a first image capturing step of capturing, from each of a plurality of image pickup units provided with an optical system which forms images of subjects and image sensors which capture the images of the subjects formed by the optical system with two-dimensionally arrayed light receiving elements as electric signals, an image of the subject formed by light in a first wavelength range as a first image;
a second image capturing step of capturing from at least one of the plurality of image pickup units an image of the subject formed by light in a second wavelength range as a second image;
a first range image generating step of generating a first range image having the values of pixels as distance data indicating a distance on the basis of a plurality of first images captured at the first image capturing step;
a second range image generating step of generating a second range image having the values of pixels as distance data indicating a distance on the basis of second images captured at the second image capturing step;
a third range image generating step of generating a third range image on the basis of the first range image and the second range image; and
a recording step of recording the third range image onto a recording medium,
wherein in the second image capturing step, the subject is irradiated with light in the second wavelength range by a light radiating device which irradiates the subject with light in the second wavelength range, and an image of the subject formed by the reflected light thereof is captured as the second image;
wherein the first range image generating step is a range image generating step using a stereo matching technique which detects from the plurality of first images corresponding points indicating image points for the same object point, figures out the distance to the object point on the basis of the parallax of the corresponding points, and generates the first range image by using distance data indicating the distance as values of the pixels of the corresponding points;
wherein the second range image generating step is a range image generating step using a TOF technique which figures out the distance to the object point having each pixel as the image point on the basis of the second image representing pixel values according to the length of time taken by the light of the second wavelength range to irradiate the subject and reach the image pickup units, and generates the second range image by using the distance data indicating the distance as the value of each pixel;

wherein in the third range image generating step, the third range image is generated by interpolating the first range image with the second range image, and wherein the third range image generating device applies distance data obtained from pixels corresponding to the second range image to distance data for pixels whose distance could not be calculated in the generating of the first range image.

26. The method of generating range images according to claim 25, wherein in the third range image generating step, the third range image is generated by interpolating the distance data of pixels around the corresponding points detected for the first range image at the first range image generating step with the second range image.

27. The method of generating range images according to claim 25, wherein the first wavelength range is a visible wavelength range and the second wavelength range is a wavelength range including invisible light.

28. The method of generating range images according to claims 25, wherein the second wavelength range is an infrared wavelength range.

29. The method of generating range images according to claim 25, wherein in the recording step, the first image captured from one image pickup unit out of the plurality of image pickup units is recorded onto the recording medium together with the third range image.

30. The method of generating range images according to claim 25, wherein in the image pickup unit which captures the first images in the first image capturing step, first pixel filters of a single type which transmit light of the first wavelength range or first pixel filters comprising a plurality of types which transmit each of a plurality of wavelength ranges into which the first wavelength range is divided are arranged in the light receiving elements of the image sensors, and the first images are captured with the light receiving elements in which the first pixel filters are arranged in the first image capturing step, and wherein in the image pickup unit which captures the second images in the second image capturing step, second pixel filters which transmit light of the second wavelength range are arranged in the light receiving elements of the image sensors, and the second images are captured with the light receiving elements in which the second pixel filters are arranged in the second image capturing step.

31. The method of generating range images according to claim 30, wherein in the image pickup unit which captures the second images in the second image capturing step, a second wavelength range cut filter which cuts off light in the second wavelength range is detachably arranged on an optical path where light coming incident on the image sensors passes, in the first image capturing step, the first images are captured in a state in which the second wavelength range cut filter is inserted into the optical path, and in the second image capturing step, the second images are captured in a state in which the second wavelength range cut filter is kept away from the optical path.

32. The method of generating range images according to claim 30, wherein in the image pickup unit which captures the second images in the second image capturing step, the second pixel filters arranged in the light receiving elements of the image sensors are first pixel filters of a prescribed type having filtering characteristics to transmit light of the second wavelength range.

33. The method of generating range images according to claim 32, wherein the first wavelength range is a visible wavelength range and the first pixel filters comprise pixel filters transmitting light of the red wavelength range, pixel filters transmitting light of the green wavelength range and pixel filters transmitting light of the blue wavelength range.

34. The method of generating range images according to claim 32, wherein the prescribed type of first pixel filters having filtering characteristics to transmit light of the second wavelength range are pixel filters which transmit light of the red wavelength range.

35. The method of generating range images according to claim 32, wherein the prescribed type of first pixel filters having filtering characteristics to transmit light of the second wavelength range are all the types of first pixel filters.

36. The method of generating range images according to claim 32, further comprising a second image correcting step of correcting the second images by subtracting, from the values of the pixels of the second images captured in the second image capturing step, values according to the values of corresponding pixels of the first images captured at the first image capturing step from the same image pickup unit as the second images.

37. The method of generating range images according to claim 36, wherein in the second image correcting step, the second images are corrected by subtracting the product of multiplying the value of the corresponding pixel in the first images by a prescribed value from the value of each pixel in the captured second images.

38. The method of generating range images according to claim 37, wherein the prescribed value is set according to the ratio of the level of exposure at the time of capturing the second images and the level of exposure at the time of capturing the first images.

39. The method of generating range images according to claim 30, wherein in the image pickup unit into which the second images are captured in the second image capturing step, the second pixel filters are pixel filters arranged in different light receiving elements from the light receiving elements in which the first pixel filters are arranged.

40. The method of generating range images according to claim 39, wherein the first wavelength range is the green wavelength range and the first pixel filters are pixel filters which transmit light in the green wavelength range.

41. The method of generating range images according to claim 39, wherein the second wavelength range is the infrared wavelength range and the second pixel filters are pixel filters which transmit light in the infrared wavelength range.

42. The method of generating range images according to claim 39, wherein in the image pickup unit into which the second images are captured by the second image capturing device, the first pixel filters and the second pixel filters are arranged alternately.

43. The method of generating range images according to claim 39, wherein in the image pickup unit into which the second images are captured by the second image capturing step, the image sensors are so configured that each of the light receiving elements is connected switchably to the electric charge discharging side and the electric charge transferring side via electrical switches.

44. The method of generating range images according to claim 43, wherein the electrical switches are independently controlled by the light receiving elements in which the first pixel filters are arranged and the light receiving elements in which the second pixel filters are arranged.

45. The method of generating range images according to claim 39, wherein the image pickup unit into which the second images are captured by the second image capturing step is so configured as to prevent the light receiving elements in which the first pixel filters are arranged and the light receiving elements in which the second pixel filters are arranged from overlapping each other in the period of exposure.

46. The method of generating range images according to claim 45, wherein the subject is irradiated with light in the second wavelength range by a light radiating device, which irradiates the subject with light in the second wavelength range during the exposure period of the light receiving elements in which the second pixel filters are arranged, and the irradiation with light by the light radiating device is suspended during the exposure period of the light receiving elements in which the first pixel filters are arranged.

47. The method of generating range images according to claim 46, wherein exposure of the light receiving elements in which the first pixel filters are arranged is not executed in the period in which the light radiating device is radiating light and in the period over which the reflected light of the light from the light radiating device arrives.

* * * * *